(12) United States Patent
Tiirola et al.

(10) Patent No.: US 10,374,774 B2
(45) Date of Patent: Aug. 6, 2019

(54) HARQ-ACK RESOURCE ALLOCATION AND USE FOR EIMTA

(71) Applicant: Nokia Solutions and Networks Oy, Espoo (FI)

(72) Inventors: Esa T. Tiirola, Kempele (FI); Timo E. Lunttila, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/475,797

(22) Filed: Sep. 3, 2014

(65) Prior Publication Data
US 2015/0092757 A1    Apr. 2, 2015

Related U.S. Application Data

(60) Provisional application No. 61/883,469, filed on Sep. 27, 2013.

(51) Int. Cl.
*H04L 5/00* (2006.01)
*H04L 1/18* (2006.01)

(52) U.S. Cl.
CPC .......... *H04L 5/0055* (2013.01); *H04L 1/1861* (2013.01); *H04L 1/1812* (2013.01)

(58) Field of Classification Search
CPC .................................................. H04L 5/0055
See application file for complete search history.

(56) References Cited

U.S. PATENT DOCUMENTS

2012/0147734 A1   6/2012   Kim et al.
2013/0155915 A1*  6/2013   Park .................... H04W 72/042
                                                            370/280

(Continued)

FOREIGN PATENT DOCUMENTS

CN   102474398 A   5/2012
CN   103283172 A   9/2013

(Continued)

OTHER PUBLICATIONS

R1-130371; NEC Group; "Study of backward compatibility of TDD eIMTA system"; 3GPP TSG RAN WG1 Meeting #72; St Julian's, Malta, Jan. 28-Feb. 1, 2013.

(Continued)

*Primary Examiner* — Sulaiman Nooristany
(74) *Attorney, Agent, or Firm* — Harrington & Smith

(57) ABSTRACT

A downlink data transmission is performed in a downlink subframe. One or more resources are determined. The one or more resources are to be used for transmission or reception of error information for the received transmission in an uplink subframe based at least on an association set between one or more downlink or special subframes and an uplink subframe. The determined association set depends on a downlink reference configuration. The association set for each uplink subframe comprises a grouping of the downlink or special subframes into at least two groups. An association set is defined only for the subframes which are uplink subframes in a corresponding downlink reference configuration. The error information is transmitted or received using the determined one or more resources in the uplink subframe. Methods, apparatus, programs, and program products are disclosed.

20 Claims, 16 Drawing Sheets

(56) References Cited

U.S. PATENT DOCUMENTS

| | | | |
|---|---|---|---|
| 2013/0223301 A1 | 8/2013 | Lee et al. | |
| 2013/0294423 A1* | 11/2013 | Wang | H04N 21/2365 370/336 |
| 2014/0161001 A1* | 6/2014 | Gao | H04W 72/0446 370/280 |
| 2014/0301338 A1 | 10/2014 | Zhong et al. | |
| 2015/0244485 A1* | 8/2015 | Nguyen | H04W 72/0446 370/280 |

FOREIGN PATENT DOCUMENTS

| WO | WO-2012/106840 A1 | 8/2012 |
|---|---|---|
| WO | WO-2012/148445 A1 | 11/2012 |
| WO | 2013064106 A1 | 5/2013 |

OTHER PUBLICATIONS

3GPP TS 36.213 V11.3.0 (Jun. 2013); 3rd Generation Partnership Project; Technical Specification Group Radio Access Network; Evolved Universal Terrestrial Radio Access (E-UTRA); Physical layer procedures (Release 11) (176 pages).

CATT, "New work item proposal for Further Enhancements to LTE TDD for DL-UL Interference Management and Traffic Adaptation", RP-121772, 3GPP TSG-RAN Meeting #58, Barcelona, Spain, Dec. 4-7, 2012 (15 pages).

MediaTek Inc., "Discussion on HARQ-ACK resource in TDD Eimta", R1-133282, 3GPP TSG-RAN WG1 Meeting #74, Barcelona, Spain, Aug. 19-23, 2013. (3 pages).

NSN, Nokia, "On HARQ timing for TDD eIMTA", R1-133477, 3GPP TSG-RAN WG1 Meeting #74, Barcelona, Spain, Aug. 19-23, 2013 (4 pages).

NEC Group; "Backward compatibility for TDD eIMTA system"; R1-133339; 3GPP TSG RAN WG1 Meeting #74, Barcelona, Spain; Aug. 19-23, 2013; whole document (3 pages).

3GPP TS 36.211 V12.0.0 (Dec. 2013); "3rd Generation Partnership Project; Technical Specification Group Radio Access Network; Evolved Universal Terrestrial Radio Access (E-UTRA); Physical channels and modulation (Release 12)"; Dec. 2013; whole document (120 pages).

Intel Corporation; "HARQ aspect for TDD eIMTA"; R1-132927; 3GPP TSG-RAN WG1 #74, Barcelona, Spain, Aug. 19-23, 2013; whole document (4 pages).

* cited by examiner

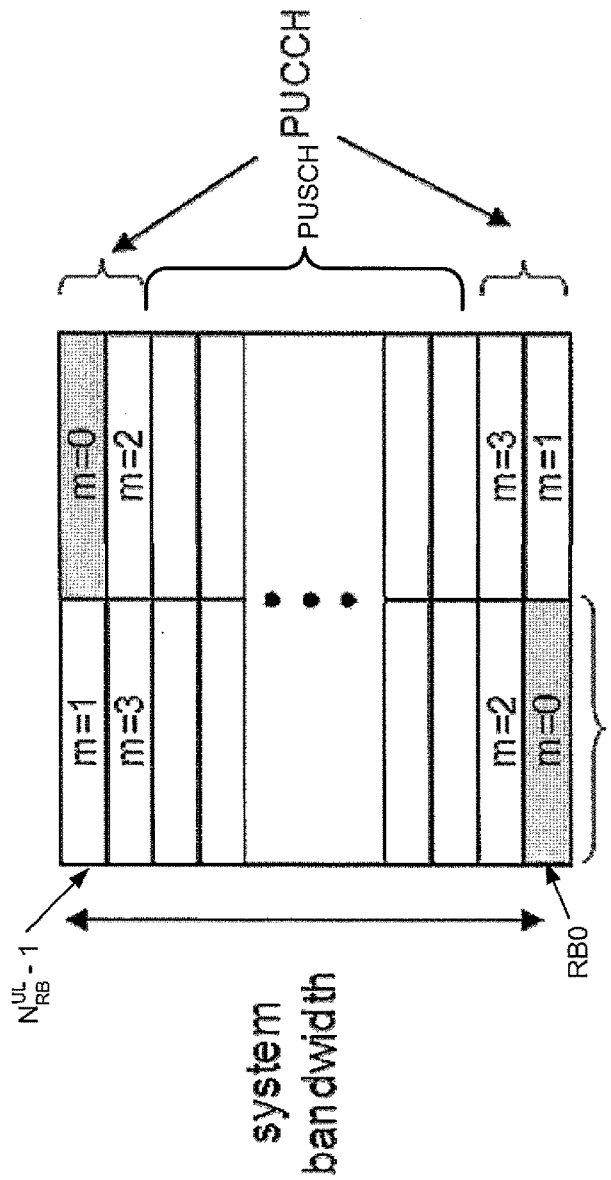

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7,6 | 4 | - | - | - | 7,6 | 4 | - |
| 2 | - | - | 8,7,4,6 | - | - | - | - | 8,7,4,6 | - | - |
| 3 | - | - | 7,6,11 | 6,5 | - | - | - | - | - | - |
| 4 | - | - | 12,8,7,11 | 6,5,4,7 | 5,4 | - | - | - | - | - |
| 5 | - | - | 13,12,9,8,7,5,4,11,6 | - | - | - | - | - | - | - |
| 6 | - | - | 7 | 7 | 5 | - | - | 7 | 7 | - |

| UL-DL Configuration given by SIB | Subframe n | | | | | | | | | |
|---|---|---|---|---|---|---|---|---|---|---|
| | 0 | 1 | 2 | 3 | 4 | 5 | 6 | 7 | 8 | 9 |
| SIB 0 | - | - | 6,7,11,13,8,4,9,5 | - | - | - | - | - | - | - |
| SIB 1 | - | - | 7,6,13,12,8,11,4,9,5 | - | - | - | - | - | - | - |
| SIB 2 | - | - | 8,7,4,6,13,12,9,11,5 | - | - | - | - | - | - | - |
| SIB 3 | - | - | 7,6,11,13,12,5,4,8,9 | - | - | - | - | - | - | - |
| SIB 4 | - | - | 12,8,7,11,13,5,4,0,9 | - | - | - | - | - | - | - |
| SIB 5 | - | - | 13,12,9,8,7,5,4,11,6 | - | - | - | - | - | - | - |
| SIB 6 | - | - | 7,13,12,11,6,8,4,9,5 | - | - | - | - | - | - | - |

FIG. 10

| UL-DL Configuration given by SIB | Subframe n | | | | | | | | | |
|---|---|---|---|---|---|---|---|---|---|---|
| | 0 | 1 | 2 | 3 | 4 | 5 | 6 | 7 | 8 | 9 |
| SIB 0 | - | - | 6,7,8,4 | - | - | - | - | 6,7,8,4 | - | - |
| SIB 1 | - | - | 7,6,9,4 | - | - | - | - | 7,6,8,4 | - | - |
| SIB 2 | - | - | 8,7,4,6 | - | - | - | - | 8,7,4,6 | - | - |
| SIB 3 | - | - | 8,4 | - | - | - | - | - | - | - |
| SIB 4 | - | - | | - | - | - | - | - | - | - |
| SIB 5 | - | - | 7,6,8,4 | - | - | - | - | 7,8,6,4 | - | - |
| SIB 6 | - | - | | - | - | - | - | - | - | - |

FIG. 17

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | - | - | - | - | - | - | - | - | - | - |
| | 1 | - | - | 6 | - | - | - | - | 6 | - | - |
| | 2 | - | - | 7,6 | - | - | - | - | 7,6 | - | - |
| | 3 | Invalid | | | | | | | | | |
| | 4 | Invalid | | | | | | | | | |
| | 5 | Invalid | | | | | | | | | |
| | 6 | - | - | 8,7,4,6 | - | - | - | - | 8,7,4,6 | - | - |
| 4 | 0 | - | - | 7,(6) | - | - | - | - | 7 | - | - |
| | 1 | - | - | - | 4 | - | - | - | - | - | - |
| | 2 | - | - | 7,(6),11 | 6,5 | - | - | - | - | - | - |
| | 3 | - | - | 12,8,7,11 | 6,5,4,7 | - | - | - | - | - | - |
| | 4 | Invalid | | | | | | | | | |
| | 5 | - | - | - | 7 | - | - | - | - | - | - |
| | 6 | - | - | 7 | - | - | - | - | - | - | - |
| 5 | 0 | - | - | 6 | - | - | - | - | - | - | - |
| | 1 | - | - | 8,7,4,6 | - | - | - | - | - | - | - |
| | 2 | - | - | 7,6,11 | - | - | - | - | - | - | - |
| | 3 | - | - | 12,8,7,11 | - | - | - | - | - | - | - |
| | 4 | - | - | 13,12,9,8,7,5,4,11,6 | - | - | - | - | - | - | - |
| | 5 | - | - | 7 | - | - | - | - | - | - | - |
| | 6 | - | - | - | - | - | - | - | - | - | - |

FIG. 17

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | - | - | 7, 8, 4 | - | - | - | - | 7, 8, 4 | - | - |
| | 1 | - | - | 8, 4 | - | - | - | - | 8, 4 | - | - |
| | 2 | - | - | - | Invalid | - | - | - | - | - | - |
| | 3 | - | - | - | Invalid | - | - | - | - | - | - |
| | 4 | - | - | - | Invalid | - | - | - | - | - | - |
| | 5 | - | - | - | - | - | - | - | - | - | - |
| | 6 | - | - | 6, 8, 4 | 7, 4, 5, 6 | - | - | - | 8, 6, 4 | - | - |
| 4 | 0 | - | - | 12, 7, 11, 8 | 7, 5, 6 | - | - | - | - | - | - |
| | 1 | - | - | 12, 8, 11 | Invalid | - | - | - | - | - | - |
| | 2 | - | - | 12, 8 | 4, 7 | - | - | - | - | - | - |
| | 3 | - | - | - | Invalid | - | - | - | - | - | - |
| | 4 | - | - | - | - | - | - | - | - | - | - |
| | 5 | - | - | - | - | - | - | - | - | - | - |
| | 6 | - | - | 12, 11, 8 | 4, 5, 6 | - | - | - | - | - | - |
| 5 | 0 | - | - | 12, 7, 11, 13, 8, 4, 9, 5 | - | - | - | - | - | - | - |
| | 1 | - | - | 13, 12, 8, 11, 4, 9, 5 | - | - | - | - | - | - | - |
| | 2 | - | - | 13, 12, 9, 11, 5 | - | - | - | - | - | - | - |
| | 3 | - | - | 13, 12, 5, 4, 8, 9 | - | - | - | - | - | - | - |
| | 4 | - | - | 13, 5, 4, 6, 9 | - | - | - | - | - | - | - |
| | 5 | - | - | - | - | - | - | - | - | - | - |
| | 6 | - | - | 13, 12, 11, 6, 8, 4, 9, 5 | - | - | - | - | - | - | - |

FIG. 18

HARQ-ACK RESOURCE ALLOCATION AND USE FOR EIMTA

CROSS REFERENCE TO RELATED APPLICATION

The present application claims the benefit under 35 U.S.C. § 119(e) of U.S. Provisional Patent Application No. 61/883,469, filed on Sep. 27, 2013, the disclosure of which is hereby incorporated by reference in its entirety.

TECHNICAL FIELD

This invention relates generally to Hybrid Automatic Repeat reQuest (HARQ) resource allocation and, more specifically, relates to HARQ resource allocation for Enhanced Interference Management and Traffic Adaptation (eIMTA).

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined at the end of this document, prior to the claims.

3GPP LTE Rel-12 will be part of an LTE-Advanced system. The instant disclosure focuses on PUCCH resource allocation for HARQ-ACK related to dynamic UL-DL reconfiguration for TD-LTE (or TDD mode of LTE). As is known, HARQ-ACK is a technique for sending error information indicating received information was not correctly received. The description herein falls within the scope of Rel-12 Work Item eIMTA—"Further Enhancements to LTE TDD for DL-UL Interference Management and Traffic Adaptation". The Work Item Description for eIMTA (RP-121772 by CATT) was approved at RAN#58 meeting, Barcelona, Spain, Dec. 4-7, 2012.

The goal of the eIMTA WI is to enable more flexible TDD UL-DL reconfiguration for traffic adaptation in, e.g., small cells. The starting point following the Rel-12 assumptions is that the eNodeB may vary UL-DL configuration relatively often (e.g., for those UEs configured to a flexible UL/DL mode) compared to the existing situation where UL-DL configuration is in practice very stationary. For instance, TD-LTE Rel-11 supports UL-DL reconfiguration with periodicity of 640 ms or longer. The basic assumptions for eIMTA functionality, based on RAN WG1 progress, are listed below:

There is a predefined cell-specific UL-DL configuration broadcasted in the cell using SIB-1. The legacy UEs (Rel-8 to Rel-11) in the cell follow this configuration all the time.

No new TDD UL-DL configurations are introduced: Flexible TDD reconfiguration can only happen among existing (e.g., seven) configurations. These configurations are described in more detail below.

TDD reconfiguration can occur with (at most) radio frame (=10 ms) periodicity for those UEs configured to the new flexible configurations.

In each UL-DL configuration, there are fixed subframes where the link direction is always predetermined. These fixed subframes are denoted as D (Downlink), S (Special) and U (Uplink)

Additionally, there are as well flexible subframes (denoted as F). Flexible subframes can be used as D or U. From the measurement point of view of legacy UEs, it may be possible to use a special subframe (e.g., subframe #6 of the radio frame) only as S or D (but not U).

The number of flexible subframes depends on the scenario (such as SIB-1 configuration and DL reference configuration defining HARQ/scheduling timing for PDSCH).

Regarding the existing TDD UL-DL configurations, FIG. 1 illustrates UL/DL configurations for TD-LTE (Rel-8/9/10/11). Physical PUSCH resources are located between two PUCCH segments shown in FIG. 2. Mapping of logical PUCCH resource blocks, denoted as m, into physical PUCCH resource blocks is also shown in FIG. 2. Taking into account the logical split between different PUCCH Formats, it is noted that PUCCH Format 2/2a/2b carrying periodic CSI reports is located at the outermost resource blocks (either near RB0 or near $N_{RB}^{UL}-1$) of the system bandwidth. ACK/NACKs for persistently scheduled PDSCH and SRIs are located on the PUCCH resource blocks next to periodic CSI while the ACK/NACK resources reserved to dynamically scheduled PDSCH are located at the innermost resource blocks reserved for PUCCH. It can be noted that the size of dynamic PUCCH defines the continuous spectrum available for PUSCH. That is, the area between the areas for PUCCH may be used for PUSCH.

Turning to FIG. 3, this figure is an example of a radio frame with 10 subframes showing Downlink (D), Uplink (U) and Special (S) subframes according to exemplary SIB-1 configured UL-DL configuration #0, as well as flexible subframes available for Rel-12 UEs configured to flexible UL/DL mode. TDD configuration 0 (zero) is used in FIG. 3, but the same principle applies to other configurations as well. In addition to the SIB-1 configured UL-DL configuration, which defines whether a given subframe in the radio frame is downlink, special, or uplink subframe, in the case of flexible TDD UL-DL configurations, e.g., some of the uplink subframes can be changed from what is shown in the row labeled "SIB-1" into downlink subframes (as can a special subframe be changed into a downlink subframe).

In TDD eIMTA systems, HARQ/scheduling timing related issues are still under active discussions although basic principles have been agreed upon. The remaining open questions in RAN WG1 relate, e.g., to exact HARQ timeline, HARQ process continuity, HARQ-ACK resource allocation, and the like.

In this disclosure, the focus is placed on the HARQ-ACK resource allocation on PUCCH. In the current specifications (up to Rel-11), the PUCCH HARQ-ACK resources are implicitly determined based on the lowest (i.e., first) CCE of the corresponding PDCCH and semi-statically configured PUCCH Format 1/1a/1b starting position. Furthermore, in TDD mode, there is a separate timing offset defined as a function of SIB-1 configuration and the subframe index. From HARQ/timing point of view, the eIMTA feature will create two parallel sets of UEs sharing the same PUCCH Format 1/1a/1b resources:

Legacy UEs following HARQ/scheduling timing according to SIB-1 UL-DL configuration; and eIMTA UEs following HARQ/scheduling timing according to DL reference configuration.

This will create PUCCH resource collision problems, which should be avoided by proper system design. Otherwise, additional complexity is involved in the scheduler entity allocating shared PDCCH (and/or EPDCCH) resources between legacy UEs and eIMTA UEs.

BRIEF SUMMARY

The following is meant to include examples of possible embodiments and is not meant to be limiting.

An exemplary embodiment is a method comprising: receiving a downlink data transmission in a downlink subframe; determining one or more resources to be used for transmission of error information for the received transmission in an uplink subframe based at least on an association set between one or more downlink or special subframes and an uplink subframe, wherein the determined association set depends on a downlink reference configuration, wherein the association set for each uplink subframe comprises a grouping of the downlink or special subframes into at least two groups, and wherein an association set is defined only for the subframes which are uplink subframes in a corresponding downlink reference configuration; and transmitting the error information using the determined one or more resources in the uplink subframe.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: receiving a downlink data transmission in a downlink subframe; determining one or more resources to be used for transmission of error information for the received transmission in an uplink subframe based at least on an association set between one or more downlink or special subframes and an uplink subframe, wherein the determined association set depends on a downlink reference configuration, wherein the association set for each uplink subframe comprises a grouping of the downlink or special subframes into at least two groups, and wherein an association set is defined only for the subframes which are uplink subframes in a corresponding downlink reference configuration; and transmitting the error information using the determined one or more resources in the uplink subframe.

A further exemplary embodiment is an apparatus comprising: means for receiving a downlink data transmission in a downlink subframe; means for determining one or more resources to be used for transmission of error information for the received transmission in an uplink subframe based at least on an association set between one or more downlink or special subframes and an uplink subframe, wherein the determined association set depends on a downlink reference configuration, wherein the association set for each uplink subframe comprises a grouping of the downlink or special subframes into at least two groups, and wherein an association set is defined only for the subframes which are uplink subframes in a corresponding downlink reference configuration; and means for transmitting the error information using the determined one or more resources in the uplink subframe.

Another exemplary embodiment is a method comprising: transmitting a downlink data transmission in a downlink subframe; determining one or more resources to be used for reception of error information for the received transmission in an uplink subframe based at least on an association set between one or more downlink or special subframes and an uplink subframe, wherein the determined association set depends on a downlink reference configuration, wherein the association set for each uplink subframe comprises a grouping of the downlink or special subframes into at least two groups, and wherein an association set is defined only for the subframes which are uplink subframes in a corresponding downlink reference configuration; and receiving error information using the determined one or more resources in the uplink subframe.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: transmitting a downlink data transmission in a downlink subframe; determining one or more resources to be used for reception of error information for the received transmission in an uplink subframe based at least on an association set between one or more downlink or special subframes and an uplink subframe, wherein the determined association set depends on a downlink reference configuration, wherein the association set for each uplink subframe comprises a grouping of the downlink or special subframes into at least two groups, and wherein an association set is defined only for the subframes which are uplink subframes in a corresponding downlink reference configuration; and receiving error information using the determined one or more resources in the uplink subframe.

An additional exemplary embodiment is an apparatus comprising: means for transmitting a downlink data transmission in a downlink subframe; means for determining one or more resources to be used for reception of error information for the received transmission in an uplink subframe based at least on an association set between one or more downlink or special subframes and an uplink subframe, wherein the determined association set depends on a downlink reference configuration, wherein the association set for each uplink subframe comprises a grouping of the downlink or special subframes into at least two groups, and wherein an association set is defined only for the subframes which are uplink subframes in a corresponding downlink reference configuration; and means for receiving error information using the determined one or more resources in the uplink subframe.

BRIEF DESCRIPTION OF THE DRAWINGS

In the attached Drawing Figures:

FIG. 1 illustrates UL/DL configurations for TD-LTE (Rel-8/9/10/11);

FIG. 2 illustrates mapping of logical PUCCH RBs into physical RBs;

FIG. 5 illustrates a table for downlink association set index K: $\{k_0, k_1, \ldots k_{M-1}\}$ for TDD and is a copy of Table 10.1.3.1-1 from 3GPP TS 36.213 V11.3.0 (2013-06);

FIG. 9 illustrates a downlink association set index K: $\{k_0, k_1, \ldots k_{M-1}\}$ for TDD, DL reference configuration=5;

FIG. 10 illustrates a downlink association set index K: $\{k_0, k_1, \ldots k_{M-1}\}$ for TDD, DL reference configuration=2;

FIG. 17 is a subframe indexing table for subframes for which eIMTA and non-eIMTA UEs have the same timing (Group 1 subframes); and FIG. 18 is a subframe indexing table for subframes for which eIMTA and non-eIMTA UEs have the different timing (Groups 2 and 3 subframes).

DETAILED DESCRIPTION OF THE DRAWINGS

The exemplary embodiments herein describe HARQ-ACK resource on PUCCH allocation for eIMTA. Additional description of these techniques is presented after a system into which the exemplary embodiments may be used is described.

Figure 3:
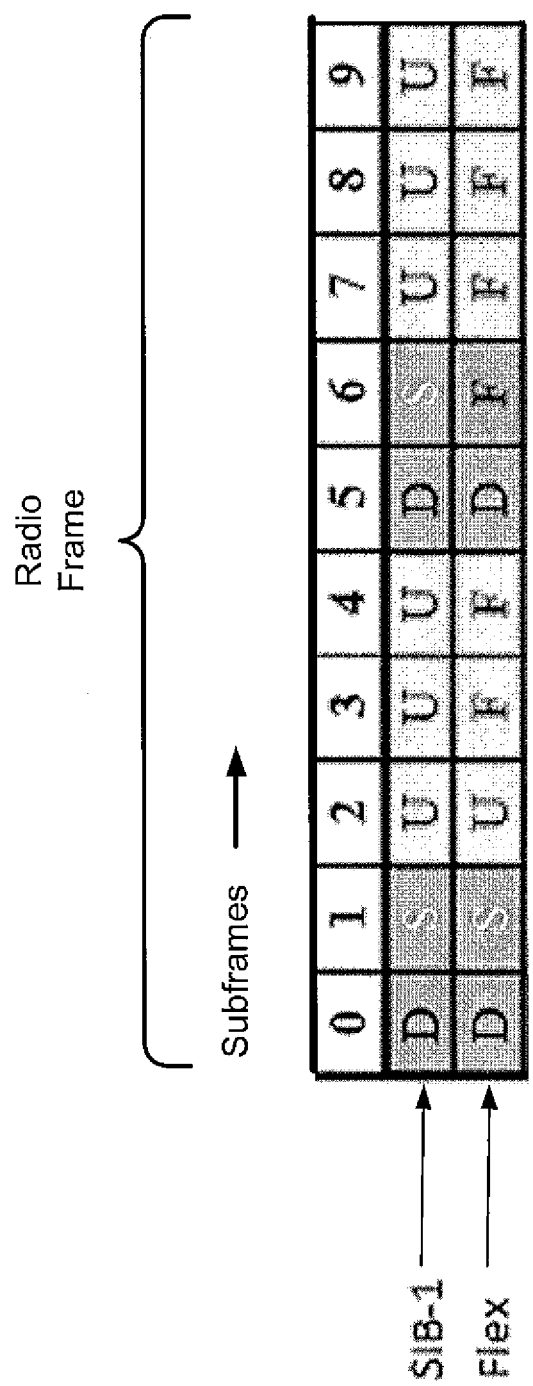
FIG. 3 is an example of a radio frame with 10 subframes showing Downlink (D), Uplink (U) and Special (S) subframes according to exemplary SIB-1 configuration #0, as well as Flexible (F) subframes available for Rel-12 UEs configured to flexible UL/DL mode.
Figure 4:
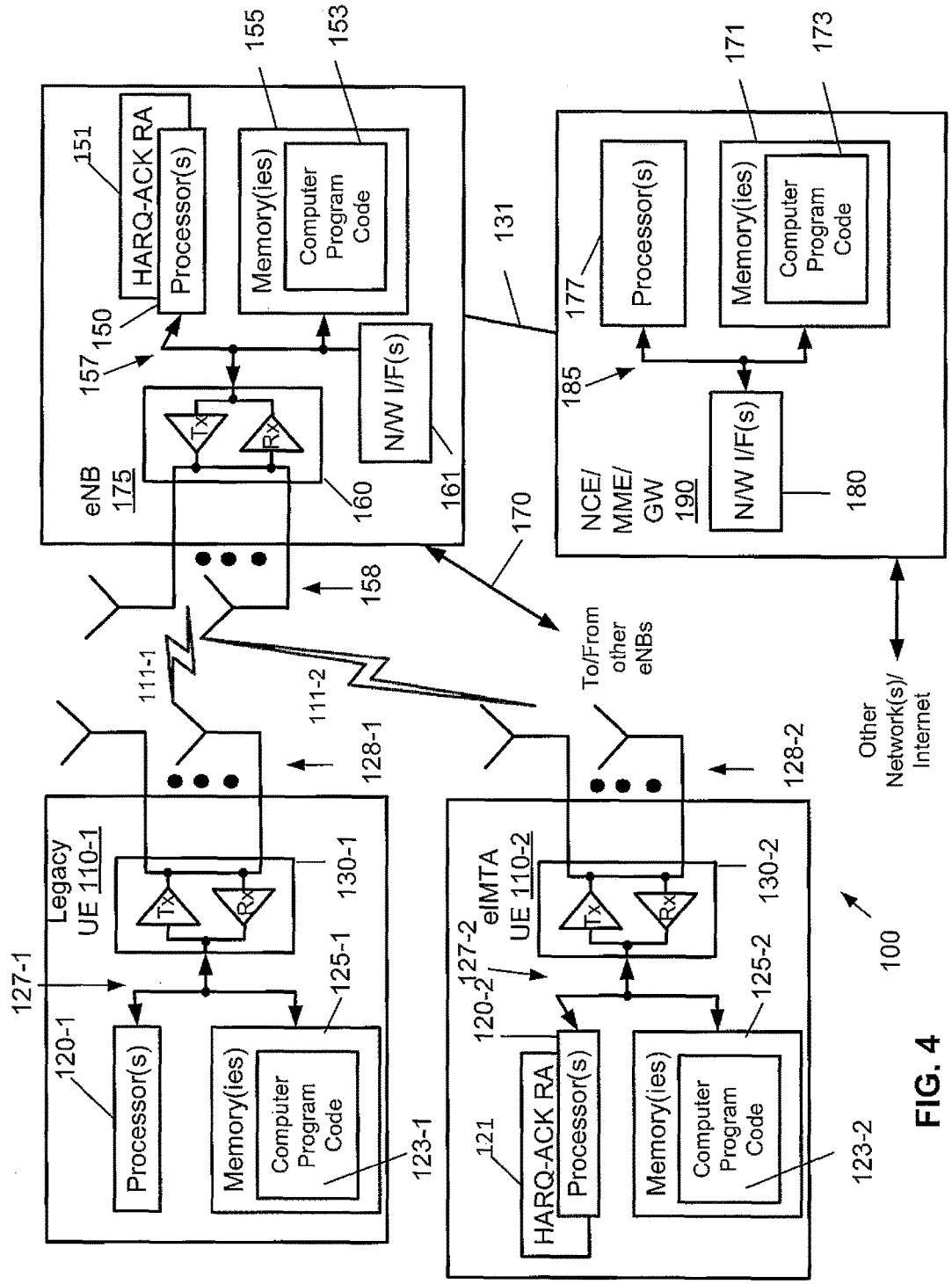
FIG. 4 is a block diagram of an exemplary system in which the exemplary embodiments may be practiced.

Turning to FIG. 4, this figure shows a block diagram of an exemplary system in which the exemplary embodiments may be practiced. In FIG. 4, a legacy UE 110-1 and an eIMTA UE 110-2 are in wireless communication with a network 100. Each of the user equipment 110 includes one or more processors 120, one or more memories 125, and one or more transceivers 130 (comprising one or more transmitters, Tx, and one or more receivers, Rx) interconnected through one or more buses 127. The one or more transceivers 130 are connected to one or more antennas 128. The one or more memories 125 include computer program code 123. The legacy UE 1104 communicates with eNB 175 via wireless link 111-1, and the eIMTA UE 110-2 similarly communicates with eNB 175 via wireless link 111-2. The eIMTA UE 110-2 includes a HARQ-ACK RA (Resource Allocation) unit 121, which causes the eIMTA UE 110-2 to perform the operations described herein. In an exemplary embodiment, the one or more memories 125-2 and the computer program code 123-2 are configured, with the one or more processors 120-2, to cause the user equipment 110-2 to perform one or more of the operations as described herein. The computer program code 123 can be code that forms the HARQ-ACK RA unit 121. In another example, the HARQ-ACK RA unit 121 is formed at least in part as circuitry, e.g., in the one or more processors 120-2. As described in more detail below, the exemplary embodiments herein concern possible resource collisions between the UEs 110-1 and 110-2 while using UL communications on the wireless links 111.

The eNB 175 includes one or more processors 150, one or more memories 155, one or more network interfaces (N/W I/F(s)) 161, and one or more transceivers 160 (comprising one or more transmitters, Tx, and one or more receivers, Rx) interconnected through one or more buses 157. The one or more transceivers 160 are connected to one or more antennas 158. The one or more memories 155 include computer program code 153. The eNB 175 further includes a HARQ-ACK RA unit 151 that causes the eNB 175 to perform operations as described herein. In an exemplary embodiment, the one or more memories 155 and the computer program code 153 are configured to, with the one or more processors 150, cause the eNB 175 to perform one or more of the operations as described herein. For instance, the HARQ-ACK RA unit 151 is implemented (e.g., at least in part) as the computer program code 153. In another example, the HARQ-ACK RA unit 151 is formed at least in part as circuitry, e.g., in the one or more processors 150. The one or more network interfaces 161 communicate over a network such as the networks 170 and 131. Two or more eNBs 175 communicate using, e.g., network 170. The network 170 may be wired or wireless or both and may implement, e.g., an X2 interface.

The wireless network 100 may include a network control element (NCE) 190 that may include MME/SGW functionality, and which provides connectivity with a further network, such as a telephone network and/or a data communications network (e.g., the Internet). The eNB 175 is coupled via a network 131 to the NCE 175. The network 131 may be implemented as, e.g., an S1 interface. The NCE 190 includes one or more processors 177, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, and 177 may be of any type suitable to the local technical environment, and may include one or more of general purpose computers, special purpose computers, microprocessors, digital signal processors (DSPs) and processors based on a multi-core processor architecture, integrated circuits (e.g., designed to carry out one or more of the operations herein), and programmable modules such as field-programmable gate arrays (e.g., designed to carry out one or more of the operations herein), as non-limiting examples. Thus, the exemplary embodiments herein may be performed by the one or more memories 125 and the computer program code 123 being configured, with the one or more processors 120, to cause the UE to perform the operations herein, may be performed by hardware (e.g., embodied in the one or more processors 120) such as integrated circuits and/or programmable modules, or by some combination of these.

In general, the various embodiments of the user equipment 110 can include, but are not limited to; cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

The exemplary embodiments herein concern HARQ-ACK resource allocation on PUCCH for eIMTA. Additional description of problems with conventional systems is first presented, and then exemplary embodiments are presented.

According to the agreements in RAN1#74, the TDD eIMTA HARQ-ACK feedback timing will most probably be based on a so-called reference configuration principle (see NSN, Nokia, "On HARQ timing for TDD eIMTA", R1-133477, 3GPP TSG-RAN WG1 Meeting #74, Barcelona, Spain, 19-23 Aug. 2013):

1) An UL reference UL/DL configuration defining:
   a) PUSCH-to-PHICH timing;
   b) DCI/PHICH-to-PUSCH timing; and
   c) The number of HARQ processes for UL; and
2) A DL reference UL/DL configuration (referred to as a "DL reference configuration" herein) defining:
   a) PDSCH-to-ACK timing;
   b) The maximum number of HARQ processes for the DL side; and
   c) HARQ-ACK signaling in UL (e.g., size of the HARQ-ACK codebook).

The most probable solution is that UL reference configuration is defined as the UL-DL configuration signaled via by SIB-1. This simplifies the resource allocation especially in the (e.g., typical) case, when there exist legacy (Rel-11 and earlier) UEs in the cell that are not able to support dynamic UL-DL reconfiguration.

In the current specifications (up to Rel-11), the PUCCH HARQ-ACK resource is implicitly determined from the corresponding physical resource indices. For example, the first CCE/ECCE index of PDCCH/EPDCCH is used to determine the DL HARQ-ACK resource, along with index of the DL subframe and the index of the OFDM symbol carrying the CCE/ECCE and some higher-layer-configured parameters.

The specific issue in PUCCH format 1a/1b resource allocation for HARQ-ACKs in TDD is that more than one DL subframe may be associated with a single UL subframe. As shown in the table shown in FIG. 5, the HARQ-ACKs corresponding to M (could be 1, 2, 3, 4) DL subframes are reported in one UL subframe. It is noted that this table is a copy of Table 10.1.3.1-1 from 3GPP TS 36.213 V11.3.0 (2013-06). Furthermore, for the table shown in FIG. 5, the UE shall use PUCCH resource in subframe n, where PDSCH transmission is indicated by the detection of corresponding PDCCH or PDCCH indicating downlink SPS release within subframe(s) n-k, where k∈K. That is, for UL-DL configuration (zero), the UE would report HARQ-ACKs in subframes 2, 4, 7, and 9 for corresponding subframe offset values of 6, 4, 6, and 4.

When considering HARQ-ACK resource allocation for PUCCH, it is good to understand in more detail the concept of the downlink association set depicted in the table of FIG. 5. The DL association set defines for each UL subframe n the timing and the order in which the HARQ feedback for each DL/special subframe is transmitted. For example, with UL-DL configuration #0, in UL subframe #n=2 the PUCCH may carry the HARQ-ACK for the DL subframe that was six subframes earlier, i.e., the HARQ delay in this case is six subframes. The table values for the HARQ delay are called the subframe offset values herein. Similarly, for UL-DL configuration 1 (one), in UL subframe #2 the HARQ-ACK may be signaled for DL subframes that were seven and/or six subframes earlier, and the PUCCH resources are filled in this specific order (e.g., first HARQ-ACK for DL subframe n-7, then for DL subframe n-6).

For PDCCH in Rel-8/9/10/11 TDD operation, PUCCH resources corresponding to multiple DL subframes are concatenated and interleaved in the associated UL subframe (e.g., with 40 CCEs per DL subframe and M=2, 80 PUCCH resources are reserved), so that there are no resource collisions between different subframes. To be specific, PDCCH resources corresponding to PDCCH OFDM symbols [s1, s2, s3, . . . ] and subframes [SF1, SF2, SF3, . . . ] are mapped to PUCCH in the following order:

SF1-s1
SF2-s1
SF3-s1
. . .
SF1-s2
SF2-s2
SF3-s2
. . .

Figure 6:
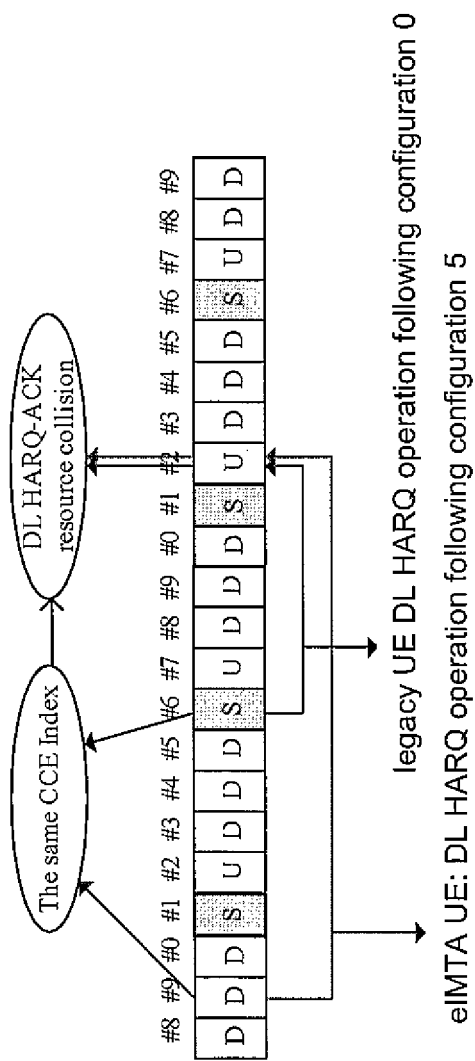
FIG. 6 illustrates PUCCH resource collisions in eIMTA and is FIG. 1 from MediaTek Inc., "Discussion on HARQ-ACK resource in TDD eIMTA", R1-133282, 3GPP TSG-RAN WG1 Meeting #74, Barcelona, Spain, 19th-23 Aug. 2013.

Since the rule governing the implicit mapping depends on the UL-DL configuration (according to the table shown in FIG. 5), it is likely that the understandings of the mapping between the physical resource index and HARQ-ACK resource between eIMTA and legacy UEs are different. In this case, the HARQ-ACK resources taken by eIMTA and legacy UEs may collide as shown in FIG. 6. FIG. 6 illustrates PUCCH resource collisions in eIMTA and is FIG. 1 from MediaTek Inc., "Discussion on HARQ-ACK resource in TDD eIMTA", R1-133282, 3GPP TSG-RAN WG1 Meeting #74, Barcelona, Spain, 19-23 Aug. 2013. R1-133282 states the following about this figure (where "FIG. 1" in the following is FIG. 6 herein): "For PUCCH format 1a/1b/1b with channel selection, the DL HARQ-ACK (i.e., PUCCH) resource is implicitly determined by the first CCE/ECCE index used for the transmission of the corresponding PDCCH/EPDCCH. One example is illustrated in FIG. 1, in which it is assumed the DL HARQ reference configuration is 5, and the SIB-1 indicated configuration is 0. An eIMTA UE receives a PDSCH in DL subframe #9, and a legacy UE receives in DL subframe #6. If the first CCE/ECCE indices used for the transmissions of the PDCCH/EPDCCHs are the same, then DL HARQ-ACK resource collision happens in UL subframe #2."

The reason for the collision is as follows. Since the legacy UE 110-1 is using configuration 0 (zero), according to the table in FIG. 5, the legacy UE 110-1 would use e.g. subframe 2 for HARQ-ACK feedback and the PUCCH in subframe 2 would carry the HARQ-ACK for the DL subframe that was 6 subframes earlier. Meanwhile, the eIMTA UE 110-2 would also use subframe 2 for HARQ-ACK feedback, since the eIMTA UE 110-2 uses configuration 5, and according to the table in FIG. 5, the eIMTA UE 110-2 would use subframe 2 and the PUCCH would carry the HARQ-ACK for the DL subframes that were 13, 12, 9, 8, 7, 5, 4, 11, and/or 6 subframes earlier. eIMTA UEs 110-2 use subframe 2 to transmit HARQ-ACK feedback corresponding to 9 subframes, with 9 different offset values (subframe with offset=13 is placed first in the PUCCH). Thus, a potential collision occurs in subframe 2, since both legacy UE 110-1 and eIMTA UE 110-2 are using the same resource (as implicitly determined by the first CCE/ECCE index) in subframe 2.

In R1-133282, the basic problems related to PUCCH HARQ-ACK resource allocation for eIMTA are discussed and three main alternatives are suggested. One alternative is implicit resource allocation. The main drawback of this alternative is that the alternative keeps the PUCCH overhead constantly high. For instance, PUCCH Format 1/1a/1b overhead can be as high as 40% (80*9 PRBs/18=40 PRBs out of 100 PRBs) when using 20 MHz BW, 3 OFDMA symbols for PDCCH and using typical PUCCH Format 1/1a/1b resource density (18 resources for HARQ-ACK per FRB which corresponds to delta shift=2; the delta shift is described in more detail below). In most cases, PUCCH Format 1/1a/1b overhead is always at maximum based on usage of a DL-heavy configuration as DL reference configuration. This means that UL capacity may become the bottleneck for eIMTA, which may mean that full potential of dynamic UL-DL traffic adaptation cannot be obtained.

A second alternative proposed in R1-133282 is explicit resource allocation. The problem with this option is that this alternative is fairly static: it is not possible to adjust the PUCCH resource dynamically and in order to avoid collisions, dedicated resource will in practice be needed for all UEs, increasing the PUCCH overhead significantly.

A third alternative proposed in R1-133282 is partially implicit and partially explicit resource allocation: This is basically a combination of alternatives one and two. The main problem with this third alternative is that it easily leads to a very complex solution.

In the following description, solutions are discussed for avoiding HARQ-ACK resource collisions on PUCCH. An exemplary aspect herein is to provide an implicit mapping rule for the HARQ-ACKs corresponding to different types of DL subframes in eIMTA (namely fixed and flexible). In other words, a new downlink association set index table is defined that is similar to the table shown in FIG. 5 for UEs configured to the eIMTA mode. Rel-12 UEs should follow a new table when configured to eIMTA & PUCCH Format 1/1a/1b feedback mode (that is, instead of following the existing table).

The problem is how to arrange DL association set indices defined by DL reference configuration (e.g., UL-DL Configuration 5) in the case of eIMTA. For example, in the case when DL reference configuration corresponds to #5, one needs to provide (see FIG. 5, UL-DL configuration 5) PUCCH resources for nine different DL subframes (n-13, n-12, n-9, n-8, n-7, n-5, n-4, n-11, n-6) during UL subframe #n=2. The exemplary embodiments below provide PUCCH resources for this and DL reference configuration #2 as well as the principles for deriving the PUCCH resources for any DL reference configuration.

In order to provide PUCCH resources for this and other DL reference configurations while eliminating the possibility of conflict in the PUCCH resources, in accordance with an exemplary embodiment, firstly (1) the DL subframes are divided into three different groups, and secondly (2) preferred DL association set indexing is provided within the group.

Regarding (1), dividing the DL subframes into three different groups, the grouping is made separately for different UL subframes available for PUCCH feedback (according to DL reference configuration) and for cases with different SIB-1 configurations. The individual groups are described as follows.

Group 1: Legacy Fixed DL Subframes

These are the subset of subframes meeting the following criteria:

The subframes are defined as DL or special subframes by DL reference configuration, and The subframes are associated with the same UL subframe as the SIB-1 configured DL subframes or special subframes with the same index. That is, the same index relates to fixed subframes (i.e., DL or S)—i.e. the same indexes are applied both eIMTA (following eIMTA-specific association set) and legacy (following association set corresponding to SIB-1 configuration).

In other words, the DL association set for Group 1 is the union of DL association sets corresponding to the SIB-1 UL-DL configuration and the DL reference UL-DL configuration. Subframe association order of this group corresponds to that of DL association set for legacy UEs. It is noted that a fixed downlink subframe is such that the transmission direction in that subframe is always DL, i.e., the subframe cannot be dynamically configured as an UL subframe.

An exception for the resource allocation rule corresponding to Group 1 may be needed in the following scenario: there exists subframe indexes in the DL association set corresponding to SIB-1 UL-DL configuration, which are not present in DL association set corresponding to the DL reference UL-DL configuration. In order to guarantee collision-free HARQ-ACK resource allocation in this scenario, the following options can be applied:

1) Introduce the concept of virtual index as proposed by R1-133282; and/or

2) Provide variable (or configurable) PUCCH Format 1/1a/1b starting position (possibly according to subframe index/SIB-1 configuration/DL reference configuration) for HARQ-ACK corresponding to eIMTA UEs.

It should be noted that the need for this option is for future study. As shown below, this option is not needed with the most relevant DL reference configurations (#2 and #5).

Group 2: Other Fixed DL Subframes

This set of subframes consists of SIB-1 signaled DL/Special subframes that do not belong in Group 1 that cannot be dynamically configured as UL subframes. Downlink association set allocation order of this subset may or may not follow the principle used in Rel-8:

1) DL subframes first, Special subframes last, otherwise
2) According to subframe index (ascending order).

Group 3: Flexible DL Subframes

This group includes the flexible DL/Special subframes, in which legacy UEs cannot be scheduled in the DL (as they are UL subframes according to SIB-1 configuration).

In an exemplary embodiment, the downlink association set allocation order of this subset is started from last flexible subframes of the radio frame and continued towards flexible subframe(s) in such a way that flexible subframes next to an UL subframe appear last in the association set. This is in line with the probability of DL allocation (the most probable DL subframes are put before less probable DL subframes).

Figure 7:
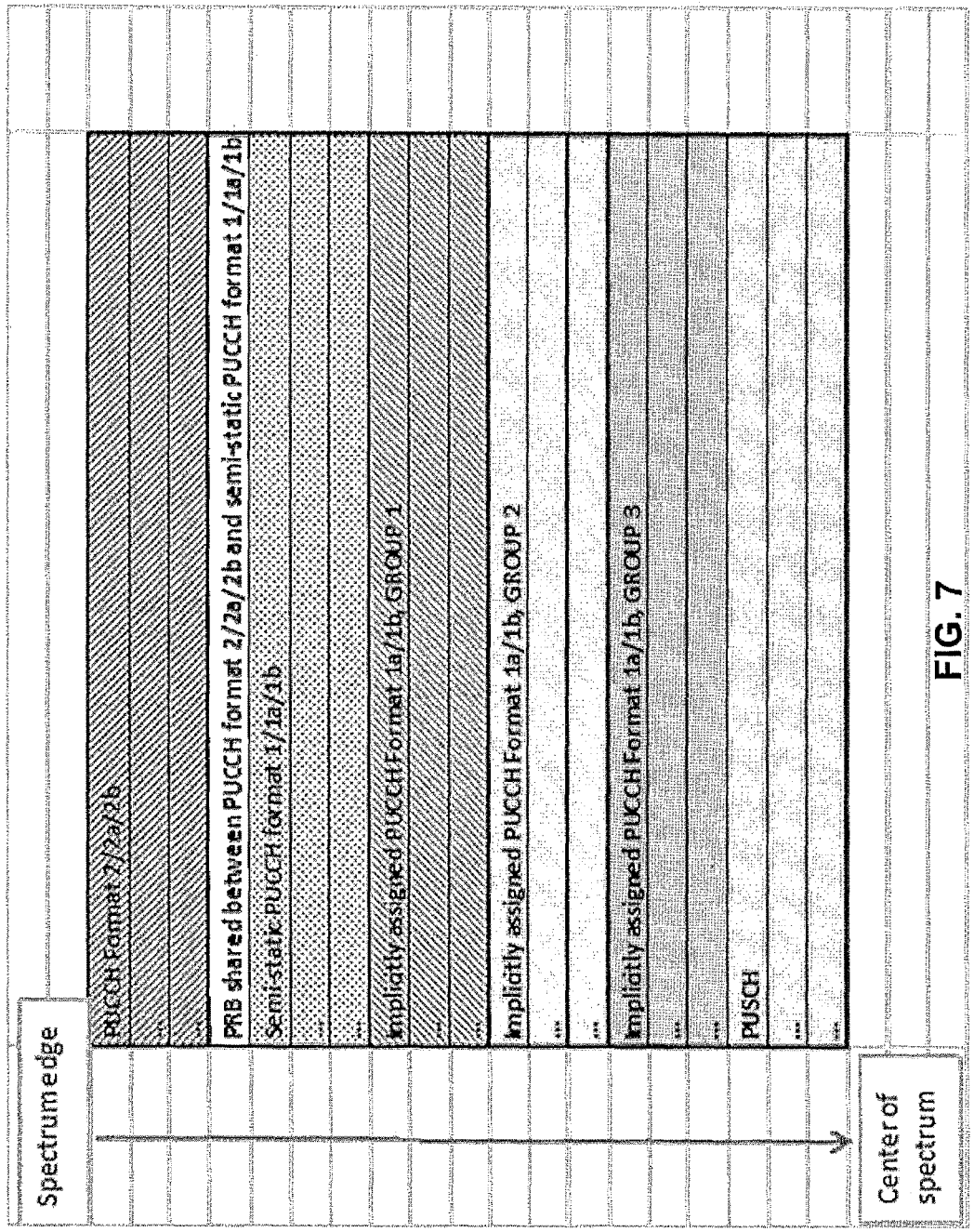
FIG. 7 illustrates an eIMTA PUCCH HARQ-ACK resource grouping according to an exemplary embodiment.

Secondly, regarding (s), where preferred DL association set indexing is provided within the group, the order in which the PUCCH resources corresponding to different groups of subframes are determined as shown in FIG. 7:

Firstly, HARQ-ACK PUCCH resources (the ones with smallest indices, located toward the edges of UL spectrum nest to the semi-static PUCCH format 1/1a/1b region) correspond to the Group 1 subframes;

Secondly, the PUCCH resources corresponding to Group 2; and

Thirdly, the PUCCH resource corresponding to Group 3.

The order (between groups and within the group) is selected in such a way that the size of continuous frequency spectrum occupied by PUCCH is minimized, and the possibilities for using unoccupied PUCCH resource for PUSCH are maximized. For instance, in FIG. 7, the likelihood of the PUCCH resources being vacant is highest among the resources located next to PUSCH region, allowing for PUSCH to be scheduled on top of those vacant PUCCH resources. The likelihood decreases gradually when moving further away from PUSCH region. It should be noted that frequency hopping PUCCH resources with the smallest resource indexes occupy the outermost parts of the system bandwidth (shown as "spectrum edge", which is the highest-numbered RB assigned, $N_{RB}^{UL}-1$) whereas PUSCH is located in the middle of the system bandwidth (i.e., toward the "center of spectrum"). See FIG. 2.

FIG. 7 presents the exemplary case when SIB-1 signaled UL-DL configuration is #0, and the DL reference configuration is UL-DL configuration #5. The presented A/N bundling windows correspond to subframe #2. FIG. 7 shows the placement of different PUCCH types in frequency spectrum (with the granularity of one physical resource block, PRB). The figure shows only one side of the spectrum. In practice PUCCH utilizes the principle of frequency hopping symmetrically over the center frequency. Hence, similar PUCCH structure exists also in another side of the uplink frequency spectrum (not shown in this figure but shown in FIG. 2).

Figure 8:
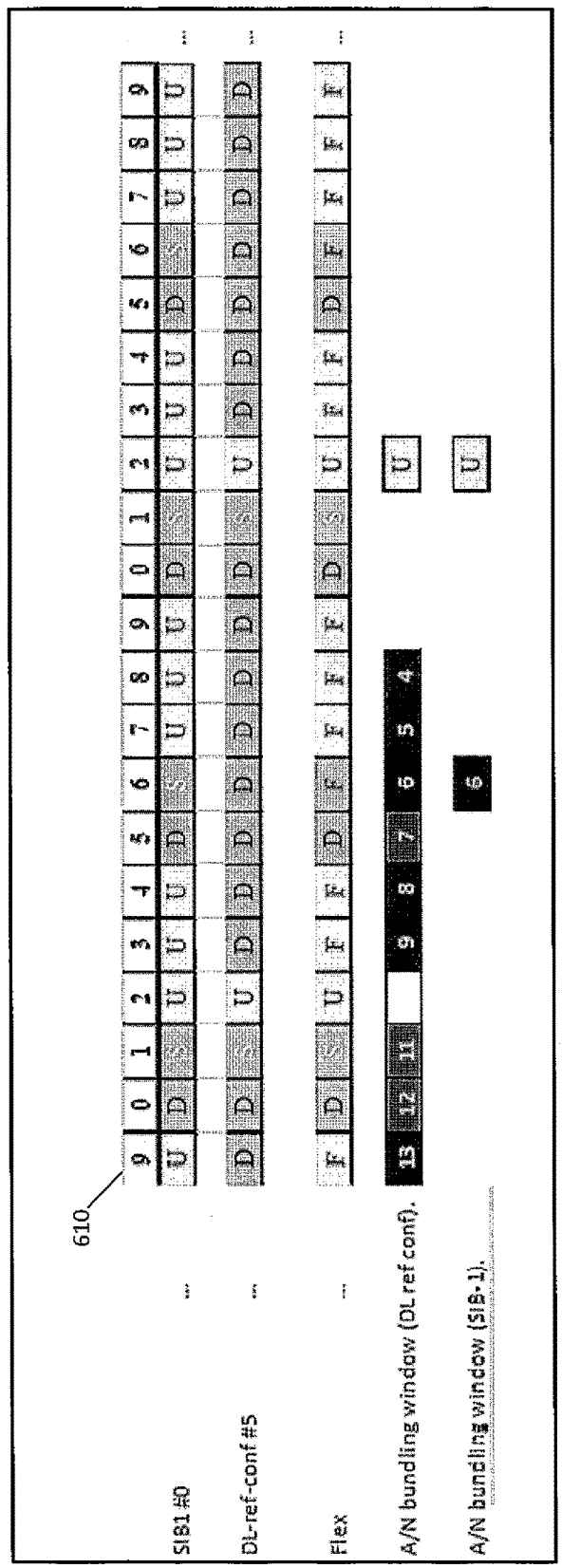
FIG. 8 illustrates grouping to DL/special subframes according to an exemplary embodiment.

An exemplary association set for a proposed case, taking into account the above ordering aspects as well, is shown in FIG. 8, which illustrates grouping to DL/special subframes according to an exemplary embodiment. The subframes 610 are shown at the top and the subframe usage for SIB-1#0, DL-reference-conf #5 (DL reference configuration #5), and Flex are also shown. The downlink reference configuration is shown as "A/N bundling window (DL ref cont)".

Group 1, which includes subframes overlapping with association set of SIB-1, includes subframe {6} (relates to subframe offset value {6}, see FIG. 5 and UL-DL configuration 5). Group 2, which includes other fixed DL subframes (DIF), includes subframes {0, 1, 5} (relates subframe offset values {12, 11 and 7} and UL-DL configuration 5, see FIG. 5). Group 3, which includes flexible subframes, includes subframes {9, 3, 4, 7, 8} (relates to subframe offset values {13, 9, 8, 5, 4 and UL-DL configuration 5}, see FIG. 5).

The original association set (DL reference configuration) was as follows: 13, 12, 9, 8, 7, 5, 4, 11, 6. The association set for legacy UEs is 6 (see "A/N bundling window (SIB-1)"). The exemplary association set for eIMTA UEs is as follows: 6, 12, 7, 11, 13, 8, 4, 9, 5.

An exemplary implementation is such that the specification defines DL reference configuration-specific tables for the downlink association set index. Both UE and eNB utilize the same table for UEs configured to eIMTA mode.

The tables in FIGS. 9 and 10 illustrate exemplary proposed downlink association set designs covering all SIB-1 UL-DL configurations. These figures also show exemplary grouping of the subframes. In these examples, the cases with most relevant DL reference configurations (#5 and #2) are shown (in FIG. 9 and FIG. 10, respectively). Based on current RAN WG1 decisions, it might be so that those options are the only supported DL reference configurations. However, based on the principle given above, it is possible to derive DL association set for any DL reference configuration).

It is noted that DL reference configuration #2 is not available with SIB-1 configured UL-DL configurations #3-5. The reason for this is because it is not in line with eIMTA working assumptions: when operating according to UL-DL configurations #3-5, usage of DL reference configuration #2 would require converting DL subframe (e.g. subframe #7) into UL subframe. That would create problems for legacy (non-eIMTA) UEs, which are making RRM/RLC measurements from all available DL subframes with an assumption that common reference signal is present in the subframe.

Figure 11:
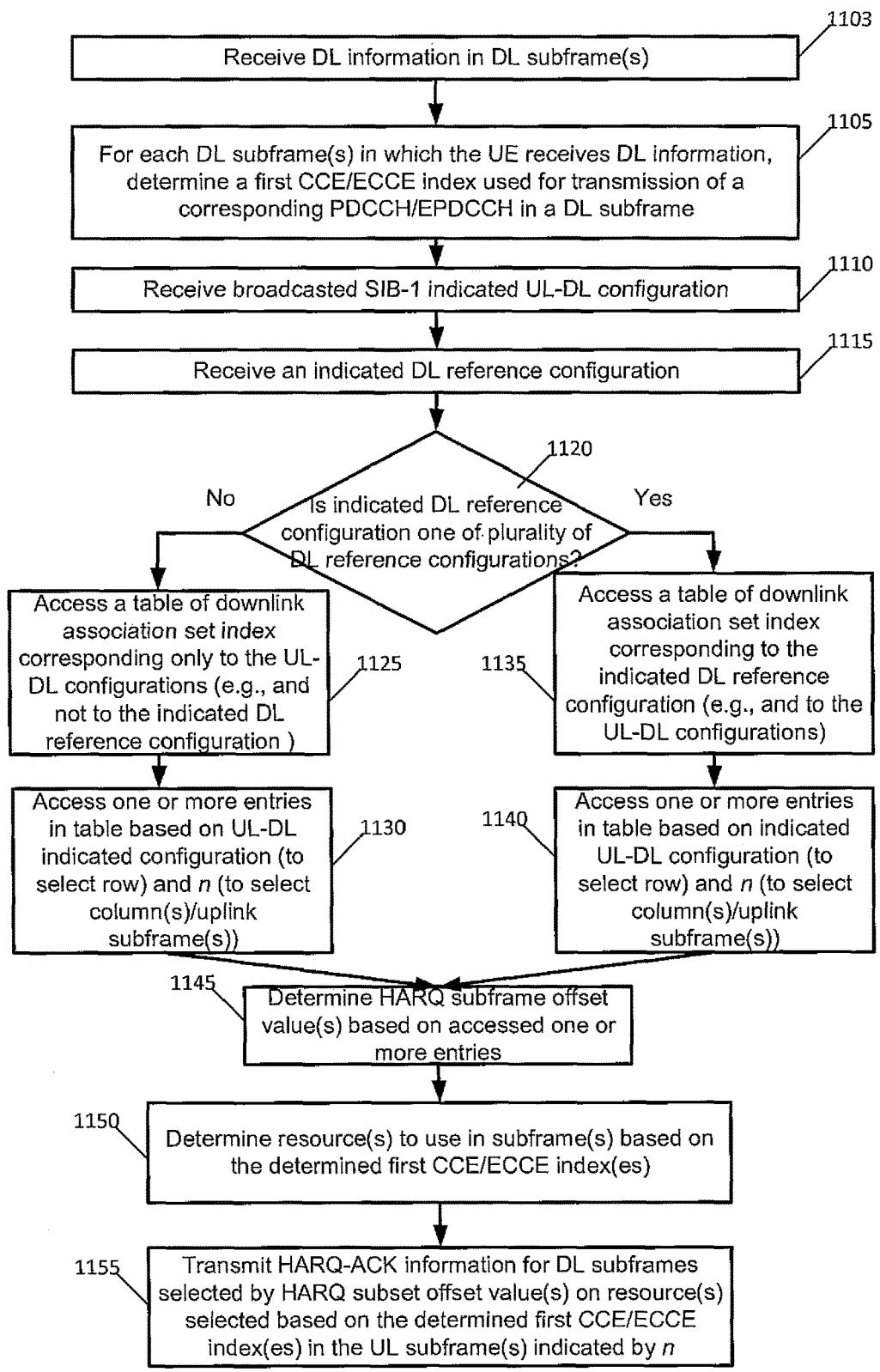
FIG. 11 is a logic flow diagram performed by a UE for HARQ-ACK resource allocation and use for eIMTA, which uses legacy and eIMTA tables of downlink association set indexes, and illustrates the operation of an exemplary method, a result of execution of computer program instructions embodied on a computer readable memory, and/or functions performed by logic implemented in hardware, in accordance with an exemplary embodiment.
Figure 12:
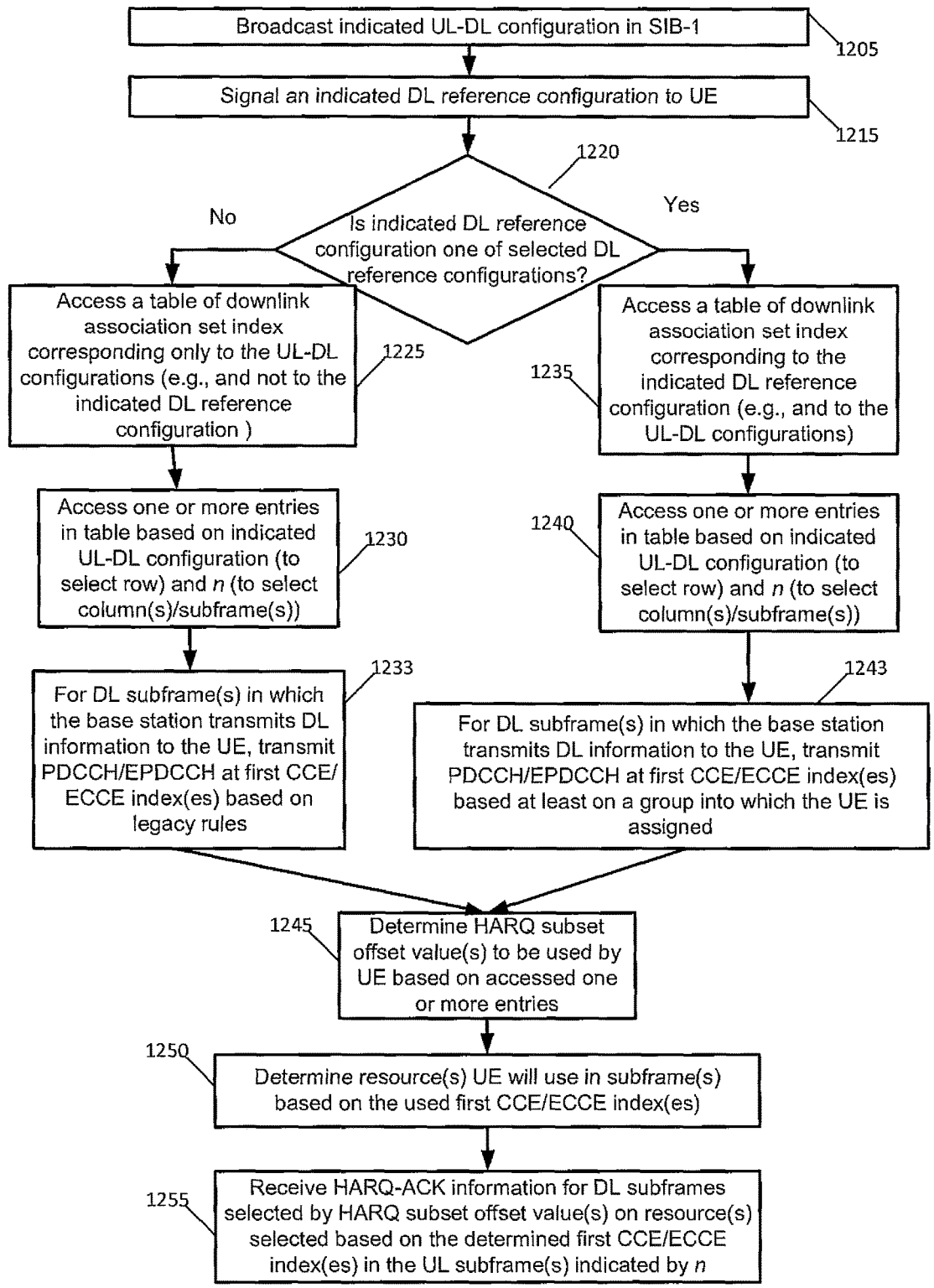
FIG. 12 is a logic flow diagram performed by an eNB for HARQ-ACK resource allocation and use for eIMTA, which uses legacy and eIMTA tables of downlink association set indexes, and illustrates the operation of an exemplary method, a result of execution of computer program instructions embodied on a computer readable memory, and/or functions performed by logic implemented in hardware, in accordance with an exemplary embodiment.
Figure 13:
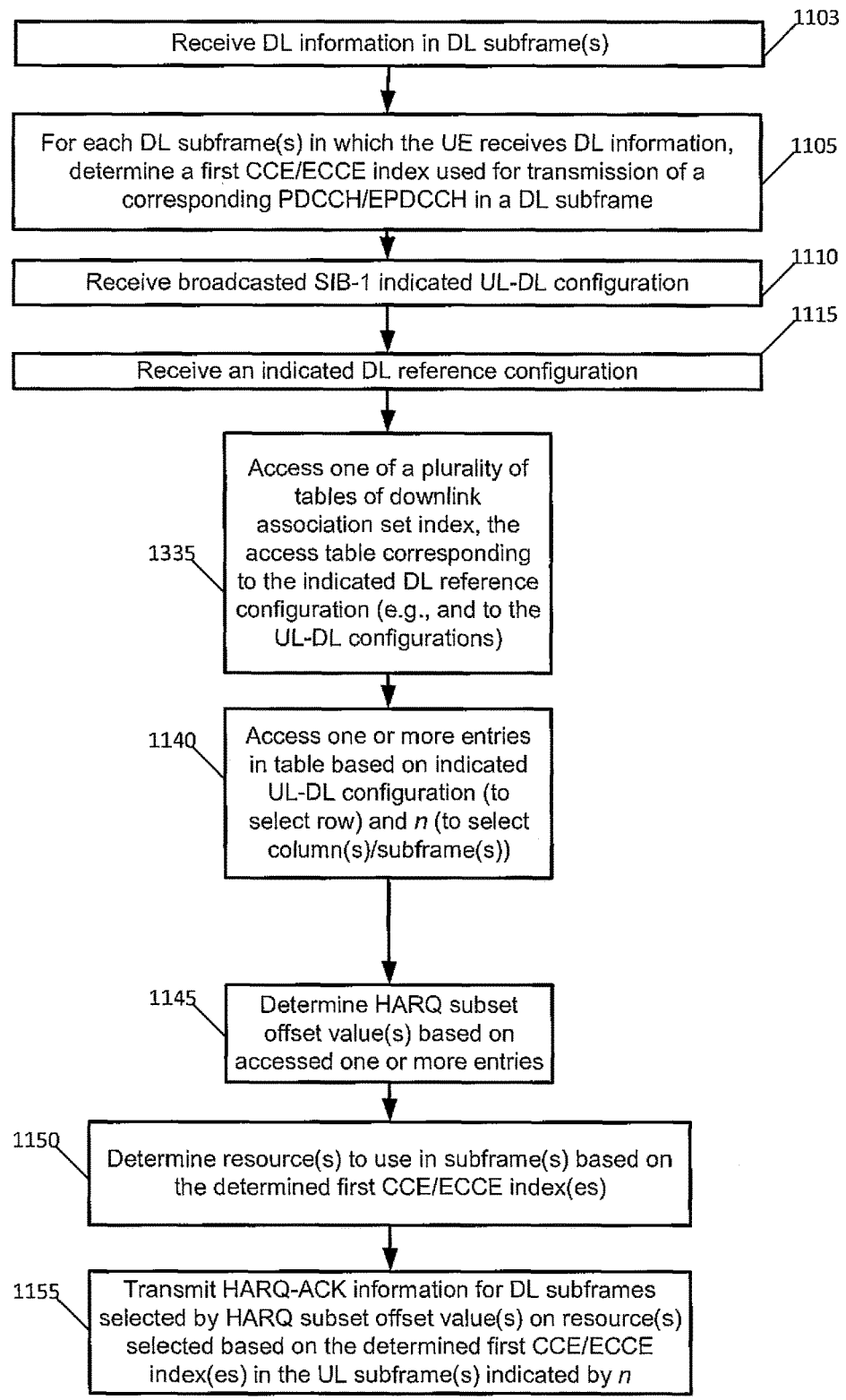
FIG. 13 is a logic flow diagram performed by a UE for HARQ-ACK resource allocation and use for eIMTA, which uses only eIMTA tables of downlink association set indexes, and illustrates the operation of an exemplary method, a result of execution of computer program instructions embodied on a computer readable memory, and/or functions performed by logic implemented in hardware, in accordance with an exemplary embodiment.
Figure 14:
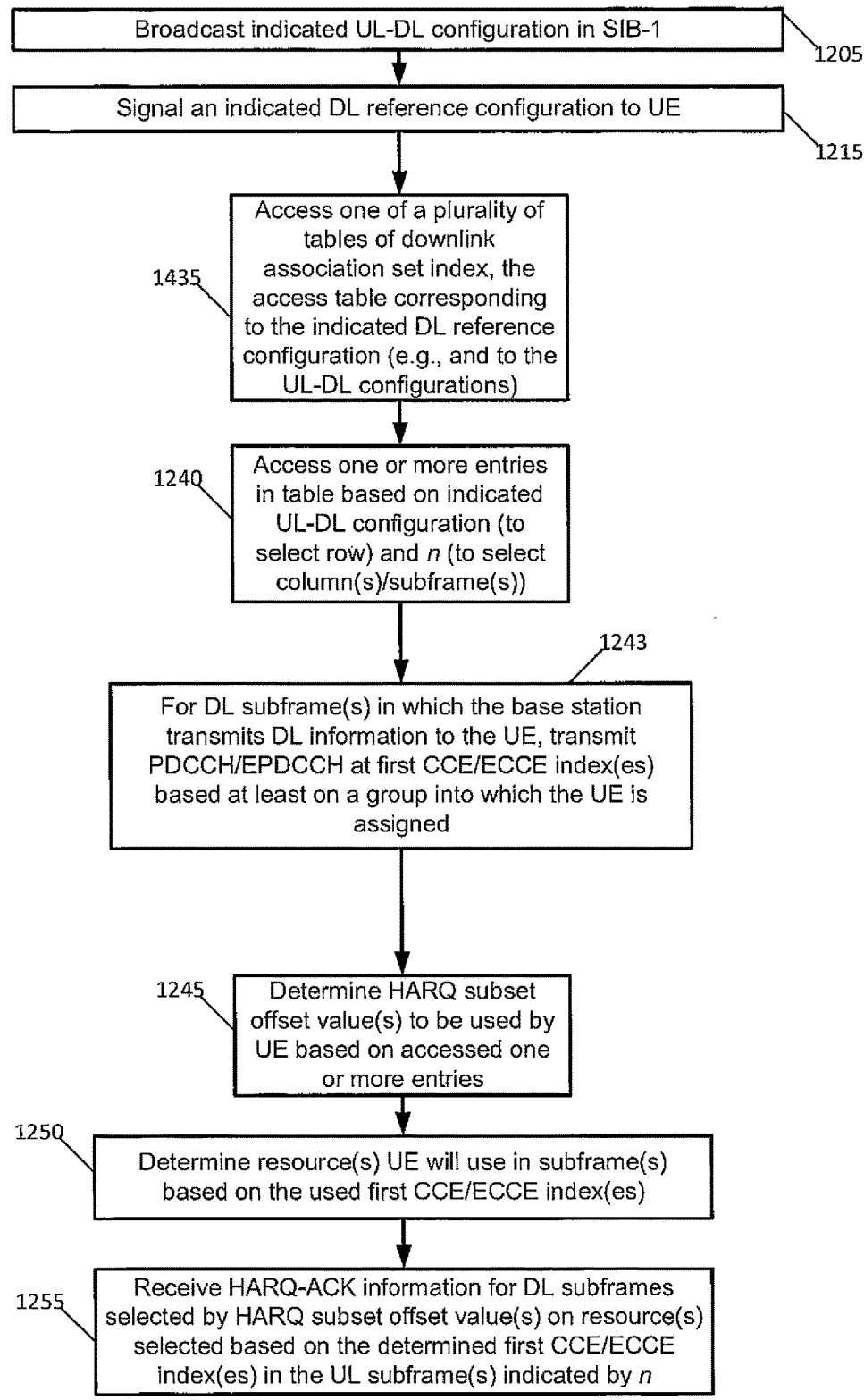
FIG. 14 is a logic flow diagram performed by an eNB for HARQ-ACK resource allocation and use for eIMTA, which uses only eIMTA tables of downlink association set indexes, and illustrates the operation of an exemplary method, a result of execution of computer program instructions embodied on a computer readable memory, and/or functions performed by logic implemented in hardware, in accordance with an exemplary embodiment.

FIGS. 12-14 are logic flow diagrams performed for HARQ-ACK resource allocation and use for eIMTA. Each of these figures illustrates the operation of an exemplary method, a result of execution of computer program instructions embodied on a computer readable memory, and/or functions performed by logic implemented in hardware, in accordance with an exemplary embodiment. FIGS. 11 and 12 are directed to a UE and an eNB, respectively, and are directed to embodiments which use legacy and eIMTA tables of downlink association set indexes. FIGS. 13 and 14 are directed to a UE and an eNB, respectively, and are directed to embodiments which use only eIMTA tables of downlink association set indexes.

It is noted that the blocks in FIGS. 12-14 are not necessarily performed in the order shown. The order is selected merely as a discussion aid.

Turning to FIG. 11, this figure is performed by eIMTA UE 110-2, e.g., under direction of the HARQ-ACK RA 121 unit. The blocks in FIG. 11 may be considered to be interconnected means or units for performing the function(s) in the blocks. In block 1103, the eIMTA UE 110-2 receives DL information in DL subframe(s). In block 1105, the eIMTA UE 110-2, for each DL subframe(s) in which the UE receives DL information, determines a first CCE/ECCE index used for transmission of a corresponding PDCCH/EPDCCH in a DL subframe. As illustrated in FIG. 8 by the "A/N bundling window (DL ref conf)", the eIMTA UE 110-2 could receive downlink information in subframes 9, 0, 1, 3, 4, 5, 6, 7, and 8, which correspond respectively to the HARQ subframe offset values of 13, 12, 11, 9, 8, 7, 6, 5, and 4. In block 1110, the eIMTA UE 110-2 receives a broadcasted SIB-1 indicated UL-DL configuration. In block 1115, the eIMTA UE 110-2 receives an indicated DL reference configuration.

This example involves use of two different sets of tables downlink association set index. The first set of tables is the "legacy" table shown in FIG. 5. The second set of tables are the "eIMTA" tables shown (as examples) in FIGS. 9 and 10. It should be noted that the legacy table in FIG. 5 has a downlink association set index corresponding only to the UL-DL configurations. Meanwhile, each of the eIMTA tables of FIGS. 9 and 10 have a downlink association set index corresponding to both the DL reference configuration and the UL-DL configurations.

In block 1120, the eIMTA UE 110-2 determines if the indicated DL reference configuration is one of a plurality of selected DL reference configurations. For instance, the selected DL reference configurations could be the DL reference configuration five or DL reference configuration two. If the indicated DL reference configuration is not one of the plurality of selected DL reference configurations (block 1120=No), the legacy table of FIG. 5 is used. Therefore, in block 1125, the eIMTA UE 110-2 accesses a table (i.e., the legacy table of FIG. 5) of downlink association set index corresponding only to the UL-DL configurations (e.g., and not to the indicated DL reference configuration). In block 1130, the eIMTA UE 110-2 accesses one or more entries in the table based on UL-DL configuration (to select row) and n (to select column(s)/uplink subframe(s)). For instance, perhaps the indicated UL-DL configuration is one, and the eIMTA UE 110-2 could access one or more entries corresponding to subframes 2, 3, 7, and/or 8.

If the indicated DL reference configuration is one of the plurality of selected DL reference configurations (block 1120=Yes), such as being DL reference configuration two or five, a corresponding eIMTA table of FIG. 9 or FIG. 10 is used. Thus, in block 1135, the eIMTA UE 110-2 accesses a table of downlink association set index corresponding to the indicated DL reference configuration (e.g., and to the UL-DL configurations). For instance, if the indicated DL reference configuration is a five, the table in FIG. 9 is used; if the indicated DL reference configuration is a two, the table in FIG. 10 is used. In block 1140, the eIMTA UE 110-2 accesses one or more entries in the table based on indicated UL-DL configuration (to select row) and n (to select column(s)/uplink subframe(s)). For instance, if the indicated UL-DL configuration is three, the eIMTA UE 110-2 would access the entry for subframe 2 (showing HARQ subframe offset values of 7, 6, 11, 13, 12, 5, 4, 8, 9).

In block 1145, the eIMTA UE 110-2 determine HARQ subframe offset value(s) based on the accessed one or more entries. In block 1150, the eIMTA UE 110-2 determines resource(s) to use in subframe(s) based on the determined first CCE/ECCE index(es). As shown in FIG. 7, the determined first CCE/ECCE indexes are used to determine where in the PUCCH spectrum the eIMTA UE 110-2 transmits the HARQ-ACK information. In block 1155, the eIMTA UE 110-2 transmits HARQ-ACK information for DL subframes selected by HARQ subset offset value(s) on resource(s) selected based on the determined first CCE/ECCE index(es) in the uplink subframe(s) indicated by n. As an example, if n is two, the indicated DL reference configuration is two (therefore FIG. 10 is used), and the UL-DL configuration is six, the eIMTA UE 110-2 would transmit (in subframe 2) HARQ-ACK information corresponding to the subframe seven subframes (as defined by one of the HARQ subframe offsets) previous to subframe 2. The resource used in the second subframe is based off the determined first CCE/ECCE index from the subframe seven subframes previous to subframe 2. Note that the entire set of HARQ subframe offset values is 7, 6, 8, 4, but only 7 is used in the previous example.

Referring to FIG. 12, FIG. 12 is performed by eNB 175, e.g., under direction of the HARQ-ACK RA unit 151. The blocks in FIG. 12 may be considered to be interconnected means or units for performing the function(s) in the blocks. This figure is directed to an embodiment which uses legacy and eIMTA tables of downlink association set indexes. In block 1205, the eNB 175 broadcasts the indicated UL-DL configuration in SIB-1. In block 1215, the eNB 175 signals a DL reference configuration to a UE.

In block 1220, the eNB 175 determines if the indicated DL reference configuration is one of a plurality of selected DL reference configurations. If not, the legacy table of FIG. 5 is used, but if so, a corresponding eIMTA table (e.g., FIG. 9 or FIG. 10) is used.

Thus, if the indicated DL reference configuration is not one of the plurality of selected DL reference configurations (block 1220=No), the legacy table of FIG. 5 is used. In block 1225, the eNB 175 accesses a table of downlink association set index corresponding only to the UL-DL configurations (e.g., and not to the indicated DL reference configuration). In block 1230, the eNB 175 accesses one or more entries in the legacy table based on indicated UL-DL configuration (to select row) and n (to select column(s)/subframe(s)). In block 1233, the eNB 175, for DL subframe(s) in which the base station transmits DL information to the UE, transmits (e.g., to the UE) PDCCH/EPDCCH at first CCE/ECCE index(es) based on legacy rules.

If the indicated DL reference configuration is one of the plurality of selected DL reference configurations (block 1220=Yes), such as being either DL reference configuration two or DL reference configuration five, a corresponding eIMTA table (e.g., FIG. 10 or FIG. 9, respectively) is used. In block 1235, the eNB 175 accesses a table of downlink association set index corresponding to the DL reference configuration (e.g., and to the UL-DL configurations). In block 1240, the eNB 175 accesses one or more entries in the legacy table based on indicated UL-DL configuration (to select row) and n (to select column(s)/subframe(s)). In block 1243, the eNB 175, for DL subframe(s) in which the base station transmits DL information to the UE, transmits PDCCH/EPDCCH at first CCE/ECCE index(es) based at least on a group into which the UE is assigned. The group assignment rules are described above. Additionally, exemplary groups are indicated in FIGS. 9 and 10, In block 1245, the eNB 175 determines HARQ subset offset value(s) to be used by UE based on the accessed one or more entries. In block 1250, the eNB 175 determine resource(s) UE will use in subframe(s) based on the used first CCE/ECCE index(es). As described above (see also FIG. 7), the used first CCE/ECCE index(es) impliedly assign the resources in the PUCCH spectrum. In block 1255, the eNB 175 receives HARQ-ACK information for DL subframes selected by HARQ subset offset value(s) on resource(s) selected based on the determined first CCE/ECCE index(es) in the UL subframe(s) indicated by n.

The following exemplary embodiments relate at least in part to FIG. 11. An exemplary method thus includes: determining whether an indicated downlink reference configuration is not or is one of plurality of selected downlink reference configurations; accessing, responsive to the determining, either a table of downlink association set indexes corresponding to a plurality of uplink-downlink configurations but not to the indicated downlink reference configuration or a table of downlink association set indexes corresponding to the indicated downlink reference configuration; accessing entries in the accessed table based on an indicated uplink-downlink configuration to determine subframe offset values and uplink subframes to use for transmitting HARQ-ACK information in uplink; and transmitting, in uplink at the determined uplink subframes, the HARQ-ACK information for downlink subframes corresponding to the determined subframe offset values.

The method of the previous paragraph, wherein the table of downlink association set indexes corresponding only to the plurality of uplink-downlink configurations but not to the indicated downlink reference configuration is accessed in response to determining the downlink reference configuration is not one of the plurality of selected downlink reference configurations and wherein the table of downlink association set indexes corresponding to the downlink reference configuration is accessed in response to determining the downlink reference configuration is one of the plurality of selected downlink reference configurations.

A method as above, further comprising receiving the indicated downlink reference configuration. A method as above, further comprising receiving the indicated uplink-downlink configuration in a SIB-1 broadcast. A method as above, wherein: the method further comprises, for each of one or more downlink subframes in which downlink information is received, determining a first CCE/ECCE index used for transmission of a corresponding PDCCH/EPDCCH in a downlink subframe; and transmitting further comprises transmitting, in uplink in resources corresponding to the determined first CCE/ECCE indexes at corresponding determined uplink subframes, the HARQ-ACK information for downlink subframes corresponding to the determined subframe offset values.

A method as above, wherein the plurality of selected downlink reference configurations consists of a downlink reference configuration of five and a downlink reference configuration of two.

The method of the previous paragraph, wherein each table for each of the downlink reference configurations has a set of entries for each of a plurality of the uplink-downlink configurations, and the plurality of uplink-downlink configurations are possible uplink-downlink configurations able to broadcast in a SIB-1 broadcast.

An apparatus comprises one or more processors and one or more memories including computer program code. The one or more memories and the computer program code are configured to, with the one or more processors, cause the apparatus to perforin at least the following: the operations for any of the methods above.

A computer program product comprises a computer-readable storage medium bearing computer program code embodied therein for use with a computer. The computer program code comprises code for causing the computer to perform any of the methods above.

An apparatus comprises means for performing the functions of any of the methods above.

The following examples relate at least in part to FIG. 12. In an exemplary embodiment, a method includes: determining whether an indicated downlink reference configuration is not or is one of plurality of selected downlink reference configurations; accessing, responsive to the determining, either a table of downlink association set indexes corresponding to a plurality of uplink-downlink configurations but not to the indicated downlink reference configuration or a table of downlink association set indexes corresponding to the downlink reference configuration; accessing entries in the accessed table based on an indicated uplink-downlink configuration to determine subframe offset values and uplink subframes to use for receiving HARQ-ACK information in uplink; and receiving, in uplink at the determined uplink subframes, the HARQ-ACK information for downlink subframes corresponding to the determined subframe offset values.

The method of the previous paragraph, wherein the table of downlink association set indexes corresponding only to the plurality of uplink-downlink configurations but not to the indicated downlink reference configuration is accessed in response to determining the downlink reference configuration is not one of the plurality of selected downlink reference configurations and wherein the table of downlink association set indexes corresponding to the downlink reference configuration is accessed in response to determining the downlink reference configuration is one of the plurality of selected downlink reference configurations.

A method as above, further comprising transmitting the indicated downlink reference configuration to a user equipment. A method as above, further comprising transmitting to a user equipment the indicated uplink-downlink configuration in a SIB-1 broadcast.

A method as above, wherein: the method further comprises, for each of one or more downlink subframes in which downlink information is transmitted to a user equipment, transmitting PDCCH/EPDCCH at one or more first CCE/ECCE indexes in corresponding one or more downlink subframe, wherein the first CCE/ECCE indexes are based on a group into which the user equipment is assigned; and receiving further comprises receiving, in uplink in resources corresponding to the determined first CCE/ECCE indexes at corresponding determined uplink subframes, the HARQ-ACK information for downlink subframes corresponding to the determined subframe offset values.

The method of the previous paragraph, wherein user equipment are grouped into the following groups: Group 1, consisting of legacy fixed DL subframes; Group 2, consisting of other fixed DL subframes; and Group 3, consisting of flexible DL subframes.

A method as above, wherein the plurality of selected downlink reference configurations consists of a downlink reference configuration of five and a downlink reference configuration of two.

The method of the previous paragraph, wherein each table for each of the downlink reference configurations has a set of entries for each of a plurality of the uplink-downlink configurations, and the plurality of uplink-downlink configurations are possible uplink-downlink configurations able to broadcast in a SIB-1 broadcast.

A computer program product comprises a computer-readable storage medium bearing computer program code embodied therein for use with a computer. The computer program code comprising code for causing the computer to perform any of the methods above.

An apparatus comprises one or more processors and one or more memories including computer program code. The one or more memories and the computer program code are configured to, with the one or more processors, cause the apparatus to perform at least the following: the operations for any of the methods above.

An apparatus comprises means for performing the functions of any of the methods above.

FIGS. 13 and 14 are directed to a UE and an eNB, respectively, and are directed to embodiments which use only eIMTA tables of downlink association set indexes. Turning to FIG. 13, this example uses multiple eIMTA tables, e.g., one per DL reference configuration. The blocks in FIG. 13 may be considered to be interconnected means or units for performing the function(s) in the blocks. There would be one table per DL reference configuration. Most of the blocks have been previously described and will not be described at this point. In block 1335, the eIMTA UE 110-2 accesses one of a plurality of tables of downlink association set index, the accessed table corresponding to the indicated DL reference configuration (e.g., and to the UL-DL configurations). The rest of the blocks are the same as in FIG. 11.

In FIG. 14, this example uses multiple eIMTA tables, e.g., one per DL reference configuration. The blocks in FIG. 14 may be considered to be interconnected means or units for performing the function(s) in the blocks. There would be one table per DL reference configuration. Most of the blocks have been previously described and will not be described at this point. In block 1435, the eIMTA UE 110-2 accesses one of a plurality of tables of downlink association set index, the accessed table corresponding to the indicated DL reference configuration (e.g., and to the UL-DL configurations). The rest of the blocks are the same as in FIG. 12.

Figure 15:
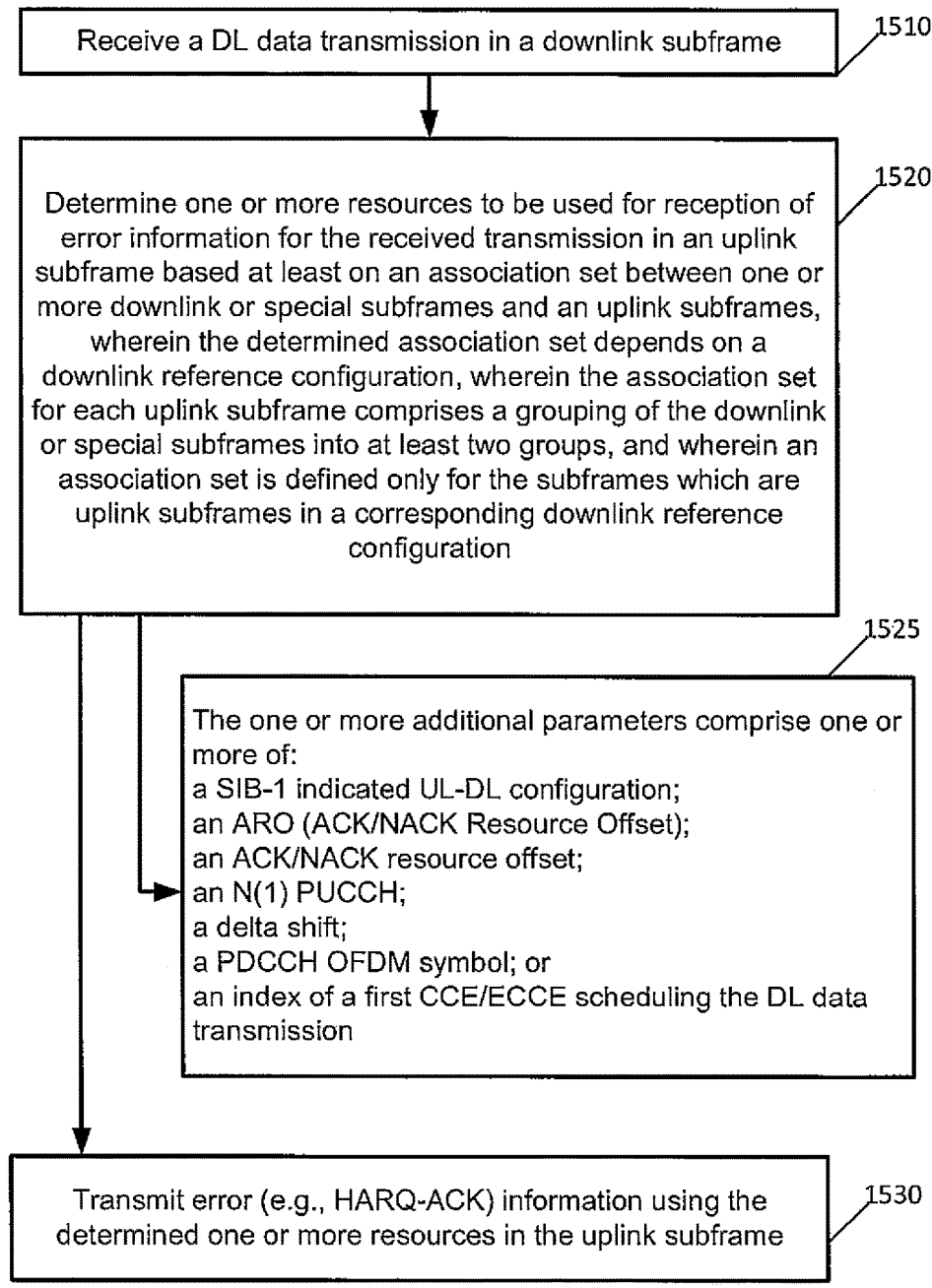
FIG. 15 is a logic flow diagram performed by a UE for HARQ-ACK resource allocation and use for eIMTA, and illustrates the operation of an exemplary method, a result of execution of computer program instructions embodied on a computer readable memory, and/or functions performed by logic implemented in hardware, in accordance with an exemplary embodiment.
Figure 16:
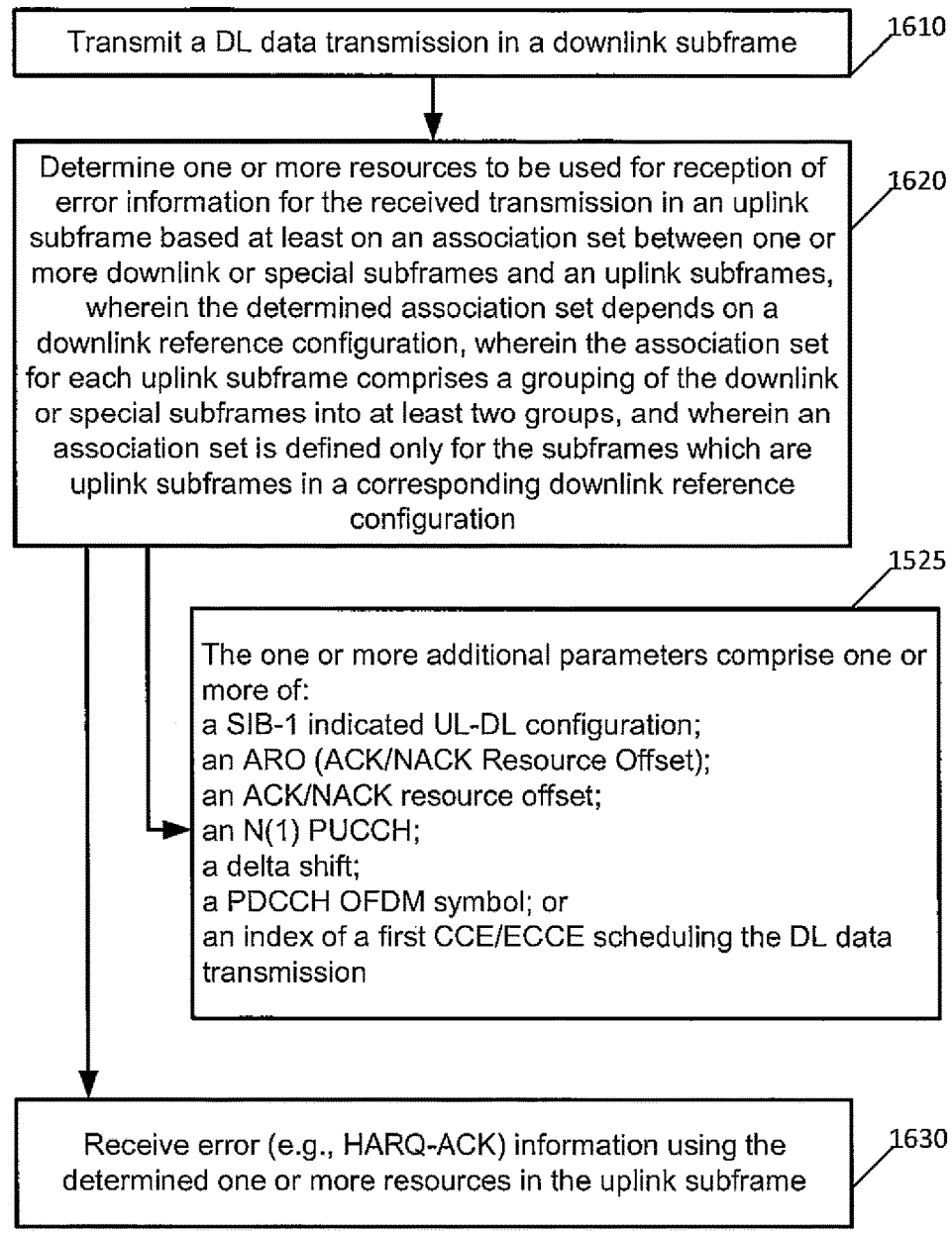
FIG. 16 is a logic flow diagram performed by an eNB for HARQ-ACK resource allocation and use for eIMTA, and illustrates the operation of an exemplary method, a result of execution of computer program instructions embodied on a computer readable memory, and/or functions performed by logic implemented in hardware, in accordance with an exemplary embodiment.

FIGS. 15 and 16 are logic flow diagrams performed by a UE or eNB, respectively for HARQ-ACK resource allocation and use for eIMTA. These figures are additional examples of possible implementations. Each of these figures illustrates the operation of an exemplary method, a result of execution of computer program instructions embodied on a computer readable memory, and/or functions performed by logic implemented in hardware, in accordance with an exemplary embodiment. Each of the blocks in the figures may be considered to be means for performing the functions in the blocks.

The blocks in FIG. 15 are assumed to be performed by a UE, e.g., under control of the HARQ-ACK resource allocation unit 121. The blocks in FIG. 15 may be considered to be interconnected means or units for performing the function(s) in the blocks. In block 1510, the UE 110 receives a DL data transmission in a downlink subframe. In block 1520, the UE determines one or more resources to be used for transmission of error information for the received transmission in an uplink subframe based at least on an association set between one or more downlink or special subframes and an uplink subframe. The determined association set depends on a downlink reference configuration. The association set for each uplink subframe comprises a grouping of the downlink or special subframes into at least two groups. An association set is defined only for the subframes which are uplink subframes in a corresponding downlink reference configuration. In block 1530, the UE 110 transmits error (e.g., HARQ-ACK) information using the determined one or more resources in the uplink subframe.

As indicated by block 1525, the one or more additional parameters may comprise one or more of the following:
  a SIB-1 indicated UL-DL configuration;
  an ARO (ACK/NACK Resource Offset);
  an ACK/NACK resource offset, which is an integer number or a variable signaled dynamically with downlink control information;
  an $N^{(1)}_{PUCCH}$, which is the number of resources reserved for persistent ACK/NACK and SRI;
  a delta shift, which is the difference in terms of cyclic shifts between two consecutive PUCCH format 1/1a/1b resources;
  a PDCCH OFDM symbol; or
  an index of a first CCE/ECCE scheduling the DL data transmission.

It should be noted that the ARO is a mechanism to avoid PUCCH resource collisions between multiple UEs. An example is shown below:

| ACK/NACK Resource offset field in DCI format 1A/1B/1D/1/2A/2/2B/2C/2D | $\Delta_{ARO}$ |
|---|---|
| 0 | 0 |
| 1 | −1 |
| 2 | −2 |
| 3 | 2 |

This is Table 10.1.2.1-1 from 3GPP TS 36.213 V11.3.0 (2013-06). For additional detail regarding the ARO, see, e.g., Section 10.1.2.1, "FDD HARQ-ACK procedure for one configured serving cell", from 3GPP TS 36.213 V11.3.0 (2013-06).

A further note regards the $N^{(1)}_{PUCCH}$. This corresponds to a semi-statically configured starting position (e.g., offset) for the dynamic PUCCH resource space. In principle, there could be more than one offset value defined, e.g. for different subframe groups. Regarding the delta shift, this parameter defines the cyclic shift difference between two adjacent ACK/NACK resources using the same orthogonal cover sequence. Hence, the delta shift defines also the number of PUCCH format 1/1a/1b resources per PRB.

Another exemplary embodiment is a method as shown in FIG. 15, wherein the association for each uplink subframe comprises a grouping of the downlink subframes into at least two groups.

A further exemplary embodiment is the method of the previous paragraph, wherein a first group comprises the following: downlink subframes that are, according to a DL reference configuration, defined as DL or special subframes and are associated with a same UL subframe as a SIB-1 configured DL or special subframes with a same index.

Another exemplary embodiment is the method of the previous paragraph, wherein a second group comprises subframes that are, according to a SIB-1 indication, downlink or a special subframe and do not belong to the first group.

A further exemplary embodiment is the method of the previous paragraph, wherein a third group comprises downlink or special subframes that are, according to a SIB-1 indication, uplink subframes or do not belong to any other group.

A further exemplary embodiment is the method of the previous paragraph, wherein determining the one or more resources to be used for transmission of HARQ-ACK information comprises, for each uplink subframe, mapping downlink subframes belonging to the first group into resources with lowest indices, followed by the DL subframes belonging to the second group mapped to resources with second lowest indices, and the downlink subframes belonging to the third group mapped to resources with largest indices.

A further exemplary embodiment is any method as described above in reference to FIG. 15, wherein determining the one or more resources to be used for transmission of HARQ-ACK information comprises for a DL reference configuration of five, using the a table shown in FIG. 9 to map downlink subframes into groups as indicated by FIG. 9.

A further exemplary embodiment is any method as described above in reference to FIG. 15, wherein determining the one or more resources to be used for transmission of HARQ-ACK information comprises for a DL reference configuration of two, using the a table shown in FIG. 10 to map downlink subframes into groups as indicated by the FIG. 10.

A further exemplary embodiment is any method as described above in reference to FIG. 15, wherein determining the one or more resources to be used for transmission of error information comprises using a table as shown in FIG. 17 for subframes in the second and third groups to determine uplink subframes to use corresponding to downlink reference configuration and to uplink-downlink configuration given by system information block-1.

A further exemplary embodiment is any method as described above in reference to FIG. 15, wherein the method is applied only by a user equipment configured to a certain mode. The method of this paragraph, where the certain mode is a time division duplexing mode or an enhanced interference management and traffic adaptation mode.

An apparatus includes one or more processors and one or more memories including computer program code. The one or more memories and the computer program code are configured to, with the one or more processors, cause the apparatus to perform at least the following: the operations for any method as described above in reference to FIG. 15.

A computer program product comprises a computer-readable storage medium bearing computer program code embodied therein for use with a computer. The computer program code comprises code for performing any method as described above in reference to FIG. 15.

An apparatus comprises means for performing the functions of any method as described above in reference to FIG. 15.

Turning to FIG. 16, FIG. 16 is assumed to be performed by an eNB 175, e.g., under direction of the HARQ ACK resource allocation unit 151. The blocks in FIG. 16 may be considered to be interconnected means or units for performing the function(s) in the blocks. In block 1610, the eNB 175 transmits a DL data transmission in a downlink subframe. In block 1620, the eNB 175 determines one or more resources to be used for reception of error information for the received transmission in an uplink subframe based at least on an association set between one or more downlink or special subframes and an uplink subframe. The determined association set depends on a downlink reference configuration. The association set for each uplink subframe comprises a grouping of the downlink or special subframes into at least two groups. An association set is defined only for the subframes which are uplink subframes in a corresponding downlink reference configuration. In block 1630, the eNB 175 receives error (e.g., HARQ-ACK) information using the determined one or more resources in the uplink subframe.

Block 1525 has been described above in reference to FIG. 15.

Another exemplary embodiment is a method as shown in FIG. 16, wherein the association for each uplink subframe comprises a grouping of the downlink subframes into at least two groups.

A further exemplary embodiment is the method of the previous paragraph, wherein a first group comprises the following: downlink subframes that are, according to a DL reference configuration, defined as DL or special subframes and are associated with a same UL subframe as a SIB-1 configured DL or special subframes with a same index.

A further exemplary embodiment is the method of the previous paragraph, wherein a second group comprises subframes that are, according to a SIB-1 indication, downlink or a special subframe and do not belong to the first group.

A further exemplary embodiment is the method of the previous paragraph, wherein a third group comprises downlink or special subframes that are, according to a SIB-1 indication, uplink subframes or do not belong to any other group.

A further exemplary embodiment is the method of the previous paragraph, wherein determining the one or more resources to be used for reception of HARQ-ACK information comprises, for each uplink subframe, mapping downlink subframes belonging to the first group into resources with lowest indices, followed by the DL subframes belonging to the second group mapped to resources with second lowest indices, and the downlink subframes belonging to the third group mapped to resources with largest indices.

A further exemplary embodiment is any method as described above in reference to FIG. 16, wherein determining the one or more resources to be used for reception of HARQ-ACK information comprises for a DL reference configuration of five, using the a table shown in FIG. 9 to map downlink subframes into groups as indicated by FIG. 9.

A further exemplary embodiment is any method as described above in reference to FIG. 16, wherein determining the one or more resources to be used for reception of HARQ-ACK information comprises for a DL reference configuration of two, using the a table shown in FIG. 10 to map downlink subframes into groups as indicated by the FIG. 10.

A further exemplary embodiment is any method as described above in reference to FIG. 16, wherein determining the one or more resources to be used for transmission of error information comprises using a table as shown in FIG. 18 for subframes in the first to determine uplink subframes to use corresponding to downlink reference configuration and to uplink-downlink configuration given by system information block-1.

A further exemplary embodiment is any method as described above in reference to FIG. 16, wherein the method is applied only by a user equipment configured to a certain mode. The method of this paragraph, where the certain mode is a time division duplexing mode or an enhanced interference management and traffic adaptation mode.

An apparatus includes one or more processors and one or more memories including computer program code. The one or more memories and the computer program code are configured to, with the one or more processors, cause the apparatus to perform at least the following: the operations for any method as described above in reference to FIG. 16.

A computer program product comprises a computer-readable storage medium bearing computer program code embodied therein for use with a computer. The computer program code comprises code for performing any method as described above in reference to FIG. 16.

An apparatus comprises means for performing the functions of any method as described above in reference to FIG. 16.

In addition to the above, the existing TDD principle for implicit HARQ-ACK resource allocation may be used when mapping CCEs corresponding to different PDCCH OFDM symbols/subframes into PUCCH Format 1/1a/1b resources. In another embodiment, it's possible to use further optimized mapping corresponding to PUCCH resources of Group 2 and Group 3 (but not for Group 1). For example, it would be possible to use "subframe first" mapping for those groups (instead of "PDCCH symbol first").

Advantages and technical effects of the exemplary embodiments include one or more of the following non-limiting examples:

1) The exemplary embodiments are fully backwards compatible such that resource collisions with non-eIMTA UEs are avoided completely (without the eNB scheduler based solution/scheduling restrictions)

2) A large advantage is that the exemplary embodiments minimize the PUCCH resource space and hence the UL overhead. The PUCCH resources do not need to be dimensioned according to the maximum number of HARQ ACK resources as the unoccupied resources will automatically appear in the end of the PUCCH region.

The smaller number of DL subframes in the selected UL-DL configuration, the smaller resource needed for PUCCH.

The unoccupied PUCCH resources can be used for PUSCH

3) The implementation can be handled easily via two additional tables in 3GPP TS 36.213 specification.

4) A solution for eIMTA PUCCH RA should be specified in any case to avoid complex scheduler restrictions.

FIGS. 17 and 18 are different ways of looking at the information in FIGS. 9 and 10. Specifically, FIG. 17 is a subframe indexing table for subframes for which eIMTA and non-eIMTA UEs have the same timing (Group 1 subframes). The subframe offset values for Group 1 for both FIG. 9 (DL reference configuration 5) and FIG. 10 (DL reference configuration 2) are in the table in FIG. 17. FIG. 17 additionally shows DL reference configuration 4. Meanwhile, FIG. 18 is a subframe indexing table for subframes for which eIMTA and non-eIMTA UEs have the different timing (Groups 2 and 3 subframes). The subframe offset values for Groups 2 and 3 for both FIG. 9 (DL reference configuration 5) and FIG. 10 (DL reference configuration 2) are in the table in FIG. 18. FIG. 18 additionally shows DL reference configuration 4.

In FIG. 17, there is a "(6)" listed. This represents a case when there exists subframe indexes in the DL association set corresponding to SIB-1 UL-DL configuration, which are not present in DL association set corresponding to the DL reference UL-DL configuration. In this case, an eIMTA UE needs to reserve the PUCCH resources according to the subframe indicated in the parenthesis, but should not map any HARQ-ACK onto those resources to avoid resource collisions.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 4. A computer-readable medium may comprise a computer-readable storage medium (e.g., memories 125, 155, 171 or other device) that does not encompass propagating signals but may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
ACK acknowledgement
A/N, ACK/NACK acknowledgement/negative acknowledgement
ARO ACK/NACK Resource Offset
CCE Control Channel Element
CSI Channel State Information (includes CSI, PMI, RI, and PTI)
D Downlink subframe
DL Downlink (from base station to UE)
ECCE Enhanced CCE
eIMTA Enhanced Interference Management and Traffic Adaptation
eNB Enhanced Node B (LTE base station)
EPDCCH Enhanced Physical Downlink Control Channel
F Flexible subframe
HARQ Hybrid Automatic Repeat reQuest
LTE Long Term Evolution
MME Mobility Management Entity
ms milliseconds
NACK Negative ACK
OFDM Orthogonal Frequency Division Multiplex
PDCCH Physical Downlink Control Channel
PDSCH Physical Downlink Control Channel
PHICH Physical HARQ Indicator Channel
PUCCH Physical Uplink Control Channel
PUSCH Physical Uplink Shared Channel
RA Resource Allocation
RAN Radio Access Network
RB Resource Block
Rel Release
RRC Radio Resource Control
S Special subframe
SF Subframe SIB System Information Block
SGW Serving GateWay
SPS Semi-Persistent Scheduling
SRI Scheduling Request Indicator
TD-LTE Time-Division-Long Term Evolution
TDD Time Division Duplexing
U Uplink subframe
UE User Equipment
UL Uplink (from UE to base station)
WI Work Item
WG Working Group

What is claimed is:

1. A method comprising:
receiving a downlink data transmission in a downlink subframe;
determining one or more resources to be used for transmission of error information for the received transmission in an uplink subframe based at least on a predetermined association set between one or more downlink or special subframes and an uplink subframe, wherein the association set depends on a downlink reference configuration, wherein the association set for each uplink subframe comprises a grouping of the downlink or special subframes into at least three groups, wherein a first group includes only legacy fixed downlink subframes reserved for legacy UEs, wherein a second group includes special fixed downlink subframes where legacy UEs cannot be scheduled in the downlink, and wherein a third group includes flexible downlink subframes where legacy UEs cannot be scheduled in the downlink, so that collisions between legacy UEs and eIMTA UEs in the uplink are avoided, and wherein an association set is defined only for the subframes which are uplink subframes in a corresponding downlink reference configuration; and
transmitting the error information using the determined one or more resources in the uplink subframe.

2. The method of claim 1, wherein determining one or more resources further comprises determining the one or more resources based on one or more additional parameters comprising one or more of:
a system information block-1 indicated uplink-downlink configuration;
an ACK/NACK resource offset;
a number of resources reserved for persistent ACK/NACK and scheduling request indicator;
a delta shift;
a number of physical downlink control channel orthogonal frequency division multiplex symbols; and
an index of a first control channel element/enhanced control channel element scheduling the downlink data transmission.

3. The method of claim 1, wherein a first group comprises subframes that are, according to a downlink reference configuration, defined as downlink or special subframes and are associated with a same uplink subframe as a system information block-1 configured downlink subframes or special subframes having a same index.

4. The method of claim 3, wherein a second group comprises subframes that are, according to a system information block-1 indication of uplink-downlink configuration, a downlink or a special subframe and do not belong to the first group.

5. The method of claim 4, wherein a third group comprises downlink or special subframes that are, according to a system information block-1 indication of uplink-downlink configuration, uplink subframes or do not belong to any other group.

6. The method of claim 5, wherein determining the one or more resources to be used for transmission of error information comprises, for each uplink subframe, mapping subframes belonging to the first group into resources with lowest indices, followed by the subframes belonging to the second group mapped to resources with second lowest indices, and the subframes belonging to the third group mapped to resources with largest indices.

7. The method of claim 5, wherein determining the one or more resources to be used for transmission of error information comprises using a table shown below for subframes in the second and third groups to determine uplink subframes to use corresponding to downlink reference configuration and to uplink-downlink configuration given by system information block-1, wherein each entry for a column for subframes 2, 3, and 7 is an association set, where DL is downlink, UL is uplink, and SIB is system information block:

| DL reference configuration | UL-DL configuration given by SIB-1 | Subframe 2 | Subframe 3 | Subframe 7 |
|---|---|---|---|---|
| 2 | 0 | 7, 8, 4 | — | 7, 8, 4 |
|   | 1 | 8, 4 | — | 8, 4 |
|   | 6 | 6, 8, 4 | — | 8, 6, 4 |
| 4 | 0 | 12, 7, 11, 8 | 7, 4, 5, 6 | — |
|   | 1 | 12, 8, 11 | 7, 5, 6 | — |
|   | 3 | 12, 8 | 4, 7 | — |
|   | 6 | 12, 11, 8 | 4, 5, 6 | — |
| 5 | 0 | 12, 7, 11, 13, 8, 4, 9, 5 | — | — |
|   | 1 | 13, 12, 8, 11, 4, 9, 5 | — | — |
|   | 2 | 13, 12, 9, 11, 5 | — | — |
|   | 3 | 13, 12, 5, 4, 8, 9 | — | — |
|   | 4 | 13, 5, 4, 6, 9 | — | — |
|   | 6 | 13, 12, 11, 6, 8, 4, 9, 5 | — | —. |

8. The method of claim 3, wherein determining the one or more resources to be used for transmission of error information comprises using a table shown below for subframes in the first group to determine uplink subframes to use corresponding to downlink reference configuration and to uplink-downlink configuration given by system information block-1, wherein each entry for a column for subframes 2, 3, and 7 is an association set, where DL is downlink, UL is uplink, and SIB is system information block:

| DL reference configuration | UL-DL configuration given by SIB-1 | Sub frame 2 | Sub frame 3 | Sub frame 7 |
|---|---|---|---|---|
| 2 | 0 | 6 | — | 6 |
|   | 1 | 7, 6 | — | 7, 6 |
|   | 2 | 8, 7, 4, 6 | — | 8, 7, 4, 6 |
|   | 6 | 7 | — | 7 |
| 4 | 1 | 7, (6) | 4 | — |
|   | 3 | 7, (6), 11 | 6, 5 | — |
|   | 4 | 12, 8, 7, 11 | 6, 5, 4, 7 | — |
|   | 6 | 7 | 7 | — |
| 5 | 0 | 6 | — | — |
|   | 1 | 7, 6 | — | — |
|   | 2 | 8, 7, 4, 6 | — | — |
|   | 3 | 7, 6, 11 | — | — |
|   | 4 | 12, 8, 7, 11 | — | — |

-continued

| DL reference configuration | UL-DL configuration given by SIB-1 | Sub frame | | |
|---|---|---|---|---|
| | | 2 | 3 | 7 |
| | 5 | 13, 12, 9, 8, 7, 5, 4, 11, 6 | — | — |
| | 6 | 7 | — | —. |

9. The method of claim 1, wherein the method is applied only by a user equipment configured to a certain mode.

10. The method of claim 9, where the certain mode is a time division duplexing mode or an enhanced interference management and traffic adaptation mode.

11. An apparatus comprising:
one or more processors; and
one or more memories including computer program code, the one or more memories and the computer program code configured, with the one or more processors, to cause the apparatus to perform at least the following:
receiving a downlink data transmission in a downlink subframe;
determining one or more resources to be used for transmission of error information for the received transmission in an uplink subframe based at least on a pre-determined association set between one or more downlink or special subframes and an uplink subframe, wherein the association set depends on a downlink reference configuration, wherein the association set for each uplink subframe comprises a grouping of the downlink or special subframes into at least three groups, wherein a first group includes only legacy fixed downlink subframes reserved for legacy UEs, wherein a second group includes special fixed downlink subframes where legacy UEs cannot be scheduled in the downlink, and wherein a third group includes flexible downlink subframes where legacy UEs cannot be scheduled in the downlink, so that collisions between legacy UEs and eIMTA UEs in the uplink are avoided, and wherein an association set is defined only for the subframes which are uplink subframes in a corresponding downlink reference configuration; and
transmitting the error information using the determined one or more resources in the uplink subframe.

12. A method comprising:
transmitting a downlink data transmission in a downlink subframe;
determining one or more resources to be used for reception of error information for the received transmission in an uplink subframe based at least on a pre-determined association set between one or more downlink or special subframes and an uplink subframe, wherein the association set depends on a downlink reference configuration, wherein the association set for each uplink subframe comprises a grouping of the downlink or special subframes into at least three groups, wherein a first group includes only legacy fixed downlink subframes reserved for legacy UEs, wherein a second group includes special fixed downlink subframes where legacy UEs cannot be scheduled in the downlink, and wherein a third group includes flexible downlink subframes where legacy UEs cannot be scheduled in the downlink, so that collisions between legacy UEs and eIMTA UEs in the uplink are avoided, and wherein an association set is defined only for the subframes which are uplink subframes in a corresponding downlink reference configuration; and
receiving error information using the determined one or more resources in the uplink subframe.

13. The method of claim 12, wherein determining one or more resources further comprises determining the one or more resources based on one or more additional parameters comprising one or more of:
a system information block-1 indicated uplink-downlink configuration;
an ACK/NACK resource offset;
a number of resources reserved for persistent ACK/NACK and scheduling request indicator;
a delta shift;
a number of physical downlink control channel orthogonal frequency division multiplex symbols; and
an index of a first control channel element/enhanced control channel element scheduling the downlink data transmission.

14. The method of claim 12, wherein a first group comprises subframes that are, according to a downlink reference configuration, defined as downlink or special subframes and are associated with a same uplink subframe as a system information block-1 configured downlink subframes or special subframes having a same index.

15. The method of claim 14, wherein a second group comprises subframes that are, according to a system information block-1 indication of uplink-downlink configuration, a downlink or a special subframe and do not belong to the first group.

16. The method of claim 15, wherein a third group comprises downlink or special subframes that are, according to a system information block-1 indication of uplink-downlink configuration, uplink subframes or do not belong to any other group.

17. The method of claim 16, wherein determining the one or more resources to be used for reception of error information comprises, for each uplink subframe, mapping subframes belonging to the first group into resources with lowest indices, followed by the subframes belonging to the second group mapped to resources with second lowest indices, and the subframes belonging to the third group mapped to resources with largest indices.

18. The method of claim 16, wherein determining the one or more resources to be used for reception of error information comprises using a table shown below for subframes in the second and third groups to determine uplink subframes to use corresponding to downlink reference configuration and to uplink-downlink configuration given by system information block-1, wherein each entry for a column for subframes 2, 3, and 7 is an association set, where DL is downlink, UL is uplink, and SIB is system information block:

| DL reference configuration | UL-DL configuration given by SIB-1 | Subframe | | |
|---|---|---|---|---|
| | | 2 | 3 | 7 |
| 2 | 0 | 7, 8, 4 | — | 7, 8, 4 |
| | 1 | 8, 4 | — | 8, 4 |
| | 6 | 6, 8, 4 | — | 8, 6, 4 |
| 4 | 0 | 12, 7, 11, 8 | 7, 4, 5, 6 | — |
| | 1 | 12, 8, 11 | 7, 5, 6 | — |
| | 3 | 12, 8 | 4, 7 | — |
| | 6 | 12, 11, 8 | 4, 5, 6 | — |

-continued

| DL reference configuration | UL-DL configuration given by SIB-1 | Subframe 2 | 3 | 7 |
|---|---|---|---|---|
| 5 | 0 | 12, 7, 11, 13, 8, 4, 9, 5 | — | — |
|   | 1 | 13, 12, 8, 11, 4, 9, 5 | — | — |
|   | 2 | 13, 12, 9, 11, 5 | — | — |
|   | 3 | 13, 12, 5, 4, 8, 9 | — | — |
|   | 4 | 13, 5, 4, 6, 9 | — | — |
|   | 6 | 13, 12, 11, 6, 8, 4, 9, 5 | — | —. |

19. The method of claim 14, wherein determining the one or more resources to be used for reception of error information comprises using a table shown below for subframes in the first group to determine uplink subframes to use corresponding to downlink reference configuration and to uplink-downlink configuration given by system information block-1, wherein each entry for a column for subframes 2, 3, and 7 is an association set, where DL is downlink, UL is uplink, and SIB is system information block:

| DL reference configuration | UL-DL configuration given by SIB-1 | Subframe 2 | 3 | 7 |
|---|---|---|---|---|
| 2 | 0 | 6 | — | 6 |
|   | 1 | 7, 6 | — | 7, 6 |
|   | 2 | 8, 7, 4, 6 | — | 8, 7, 4, 6 |
|   | 6 | 7 | — | 7 |
| 4 | 1 | 7, (6) | 4 | — |
|   | 3 | 7, (6), 11 | 6, 5 | — |
|   | 4 | 12, 8, 7, 11 | 6, 5, 4, 7 | — |
|   | 6 | 7 | 7 | — |
| 5 | 0 | 6 | — | — |
|   | 1 | 7, 6 | — | — |
|   | 2 | 8, 7, 4, 6 | — | — |
|   | 3 | 7, 6, 11 | — | — |
|   | 4 | 12, 8, 7, 11 | — | — |

| DL reference configuration | UL-DL configuration given by SIB-1 | Subframe 2 | 3 | 7 |
|---|---|---|---|---|
| 5 | 5 | 13, 12, 9, 8, 7, 5, 4, 11, 6 | — | — |
|   | 6 | 7 | — | —. |

20. An apparatus comprising:
one or more processors; and
one or more memories including computer program code, the one or more memories and the computer program code configured, with the one or more processors, to cause the apparatus to perform at least the following:
transmitting a downlink data transmission in a downlink subframe;
determining one or more resources to be used for reception of error information for the received transmission in an uplink subframe based at least on a pre-determined association set between one or more downlink or special subframes and an uplink subframe, wherein the association set depends on a downlink reference configuration, wherein the association set for each uplink subframe comprises a grouping of the downlink or special subframes into at least three groups, wherein a first group includes only legacy fixed downlink subframes reserved for legacy UEs, wherein a second group includes special fixed downlink subframes where legacy UEs cannot be scheduled in the downlink, and wherein a third group includes flexible downlink subframes where legacy UEs cannot be scheduled in the downlink, so that collisions between legacy UEs and eIMTA UEs in the uplink are avoided, and wherein an association set is defined only for the subframes which are uplink subframes in a corresponding downlink reference configuration; and
receiving error information using the determined one or more resources in the uplink subframe.

* * * * *